United States Patent
Moseley et al.

(10) Patent No.: US 6,271,896 B2
(45) Date of Patent: *Aug. 7, 2001

(54) DIRECTIONAL DISPLAY FOR A DIRECTIONAL DISPLAY HAVING AN ANGULAR INTENSITY PROFILE COMPENSATOR

(75) Inventors: Richard Robert Moseley, Horsham; Graham John Woodgate, Henley-on-Thames; David Ezra, Wallingford, all of (GB)

(73) Assignee: Sharp Kabushiki Kaisha, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,163

(22) Filed: Dec. 4, 1997

(30) Foreign Application Priority Data

Dec. 7, 1996 (GB) .................................... 9625497

(51) Int. Cl.$^7$ .................. G02F 1/1335; H04N 13/04; G02B 27/22
(52) U.S. Cl. .................. 349/15; 348/51; 359/462
(58) Field of Search .................. 345/84, 87; 349/15, 349/117; 348/51, 59; 359/462, 463

(56) References Cited

U.S. PATENT DOCUMENTS

| 4,389,093 | 6/1983 | Jackson . |
| 4,717,949 | 1/1988 | Eichenlaub . |
| 5,375,006 | * 12/1994 | Haas ..................................... 349/117 |

(List continued on next page.)

FOREIGN PATENT DOCUMENTS

| 0570179 | 5/1992 | (EP) . |
| 0625861 | 11/1994 | (EP) . |
| 0 656 555 A1 | 6/1995 | (EP) . |
| 0 708 351 A2 | 4/1996 | (EP) . |
| 0721131 | 7/1996 | (EP) . |
| 0726482 | 8/1996 | (EP) . |

(List continued on next page.)

OTHER PUBLICATIONS

G. R. Chamberlin, et al., "Three Dimensional Imaging for Video Telephony", Tao First International Symposium, Dec. 6–7, 1993.
M. Sakata, et al., "3-D displays without special glasses by image-splitter method", 3D Image Conference, 1995.
M. R. Jewell, et al., "3-D imaging systems for video communication applications", SPIE vol. 2409, p. 4–10, Apr. 1995.

*Primary Examiner*—Walter J. Malinowski
(74) *Attorney, Agent, or Firm*—Renner, Otto, Boisselle & Sklar

(57) ABSTRACT

A directional display comprises a display arrangement such as a spatial light modulator and a rear parallax barrier illuminated by a suitable backlight. The spatial light modulator and the parallax barrier cooperate to produce Fresnel diffraction which results in spatially non-uniform brightness across viewing windows of the display. Also, where the spatial light modulator has pixels of non-constant vertical aperture, further variations in the intensity profile at the windows occurs. In order to compensate for this, a mask is provided, for instance between the parallax barrier and the backlight. The mask cooperates with the parallax barrier to produce an intensity pattern having variations which are the inverse of the variations in intensity pattern produced by the parallax barrier and the spatial light modulator. The variations are superimposed and substantially cancel each other out so as to result in viewing windows which have substantially uniform light intensities.

27 Claims, 24 Drawing Sheets

U.S. PATENT DOCUMENTS

| | | | |
|---|---|---|---|
| 5,410,422 | * 4/1995 | Bos | 349/117 |
| 5,457,574 | 10/1995 | Eichenlaub. | |
| 5,486,851 | 1/1996 | Gehner et al. | 347/258 |
| 5,539,567 | 7/1996 | Lin et al. | 359/281 |
| 5,552,839 | 9/1996 | Kühl. | |

FOREIGN PATENT DOCUMENTS

| | | |
|---|---|---|
| 2278223 | 11/1994 | (GB). |
| 7230159 | 8/1995 | (JP). |
| 7287196 | 10/1995 | (JP). |
| 8606237 | 10/1986 | (WO). |

\* cited by examiner

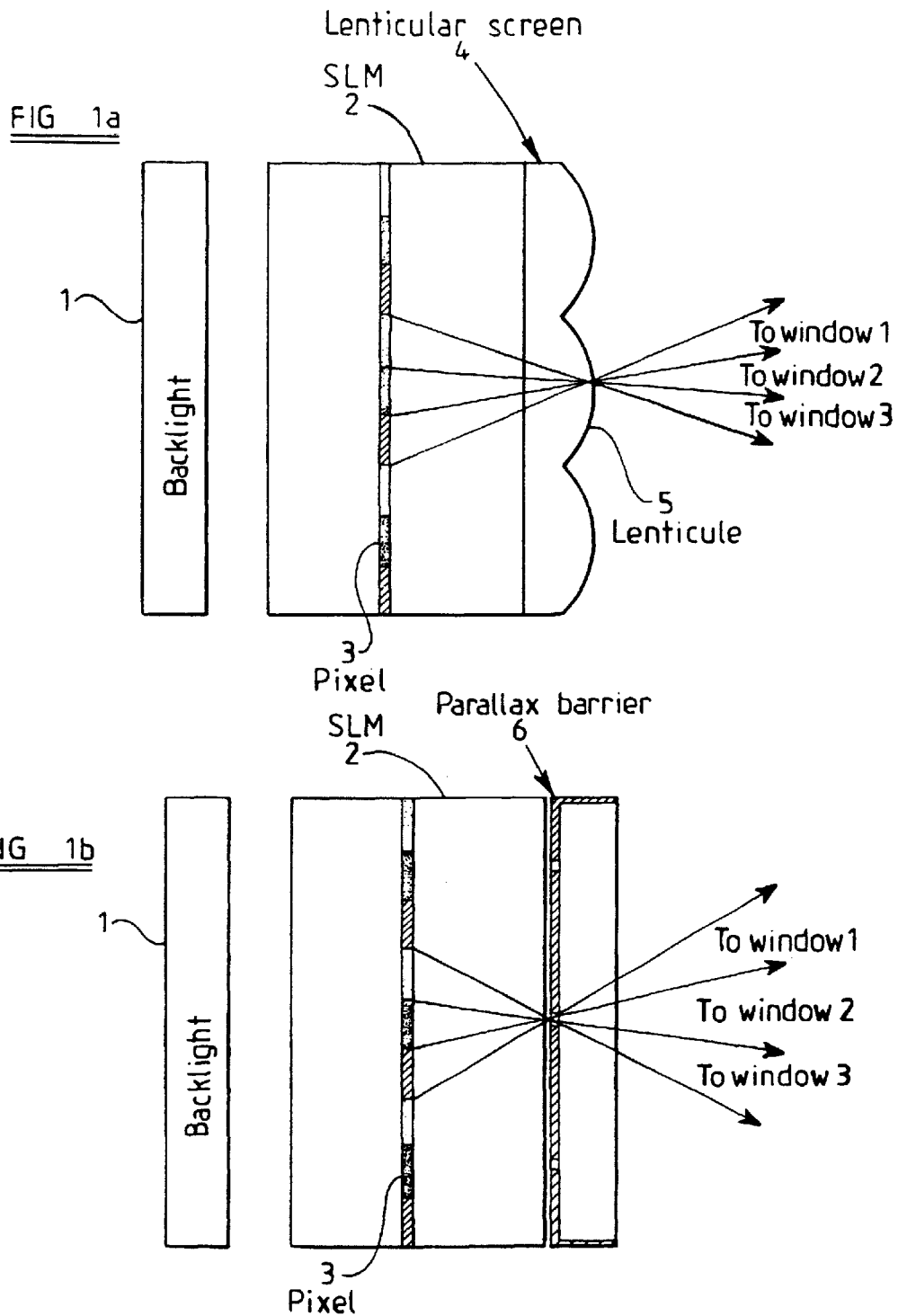

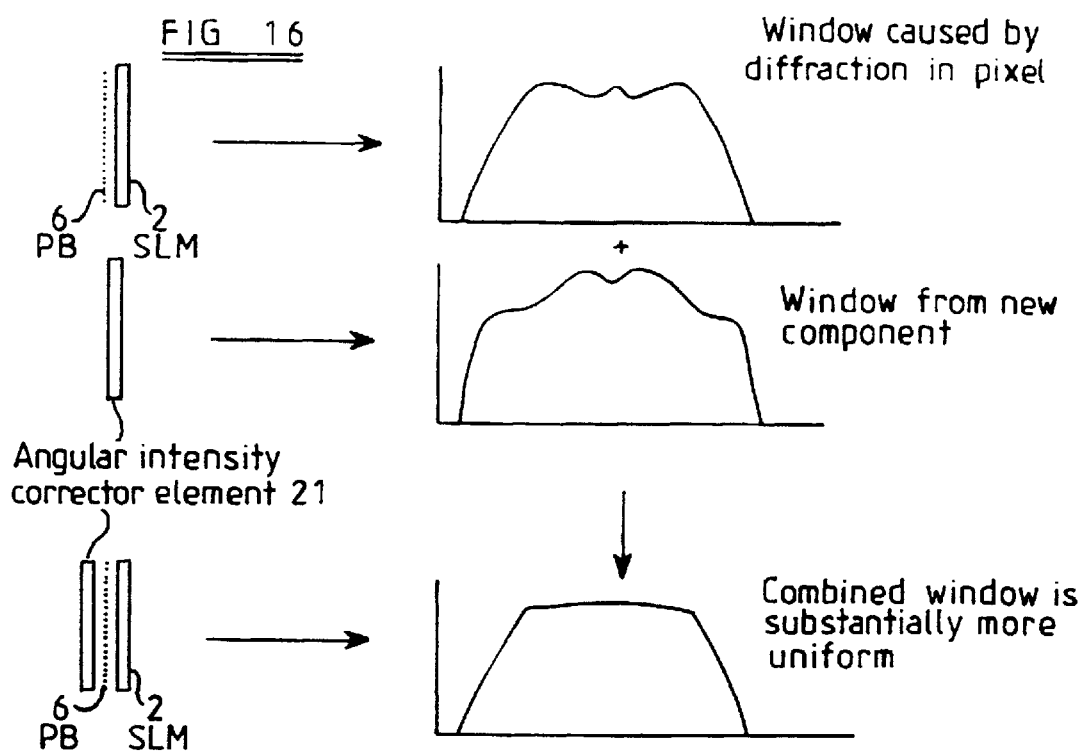
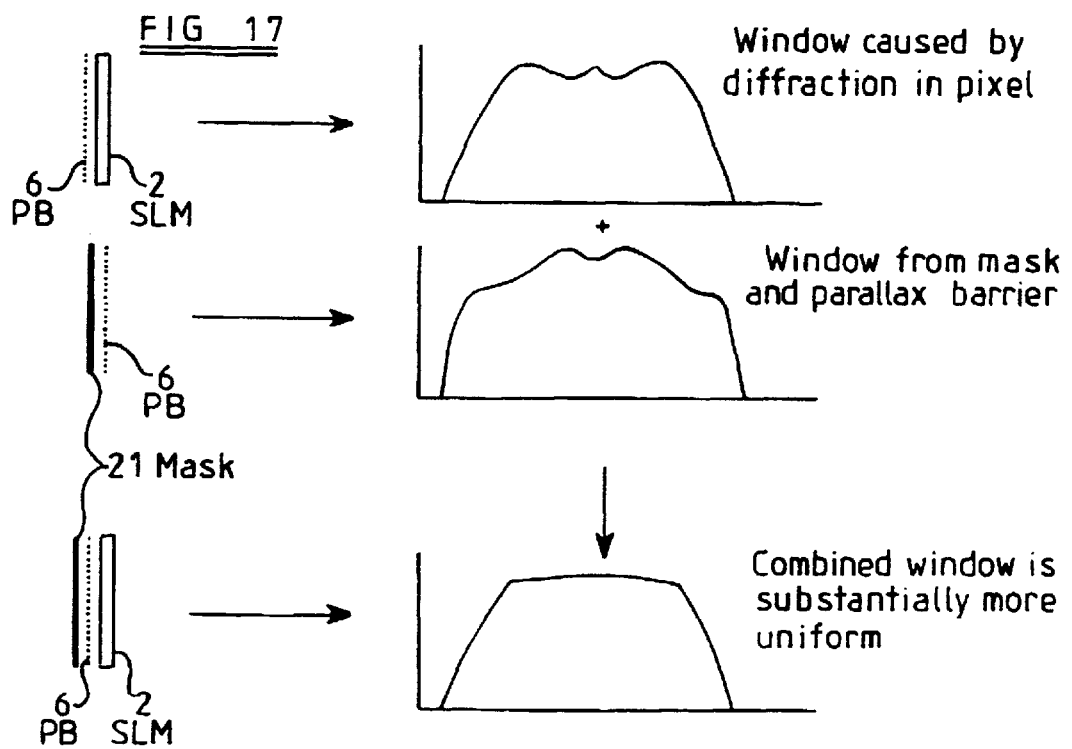

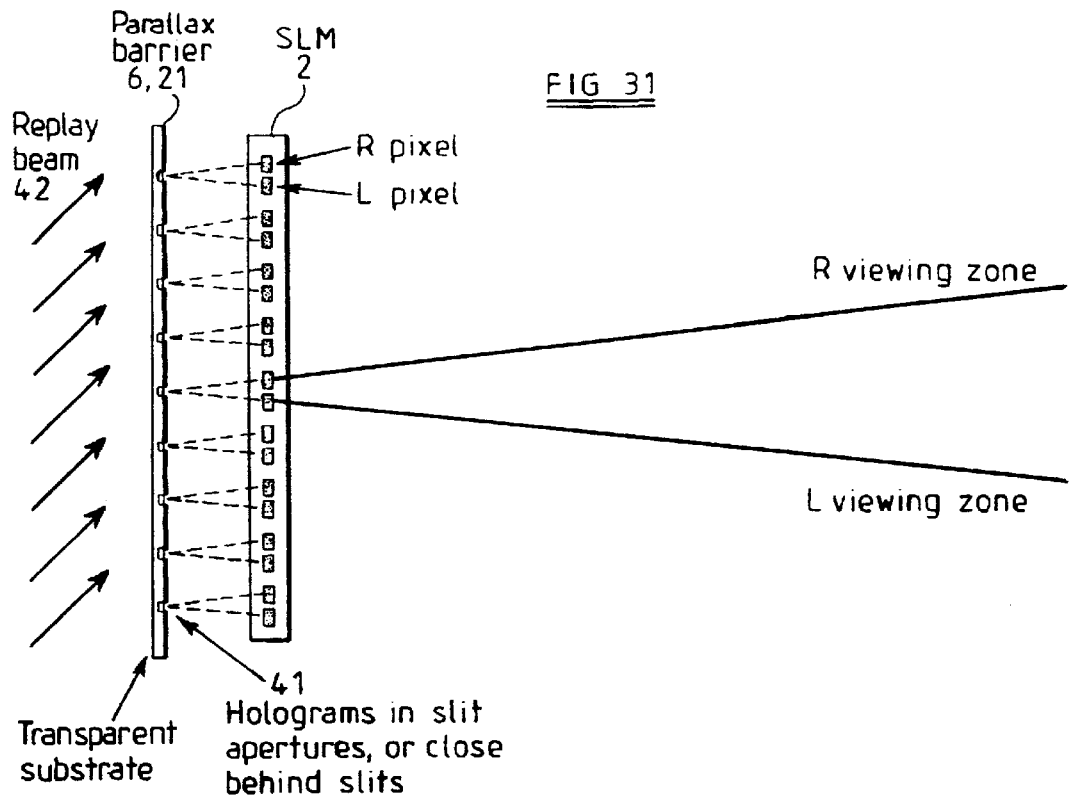
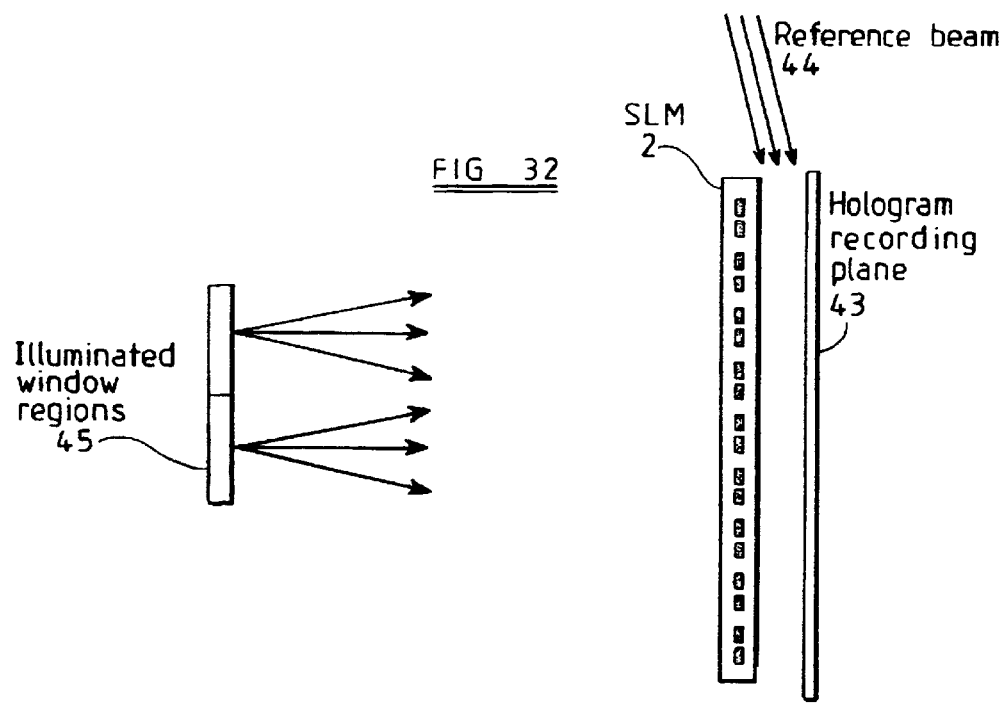

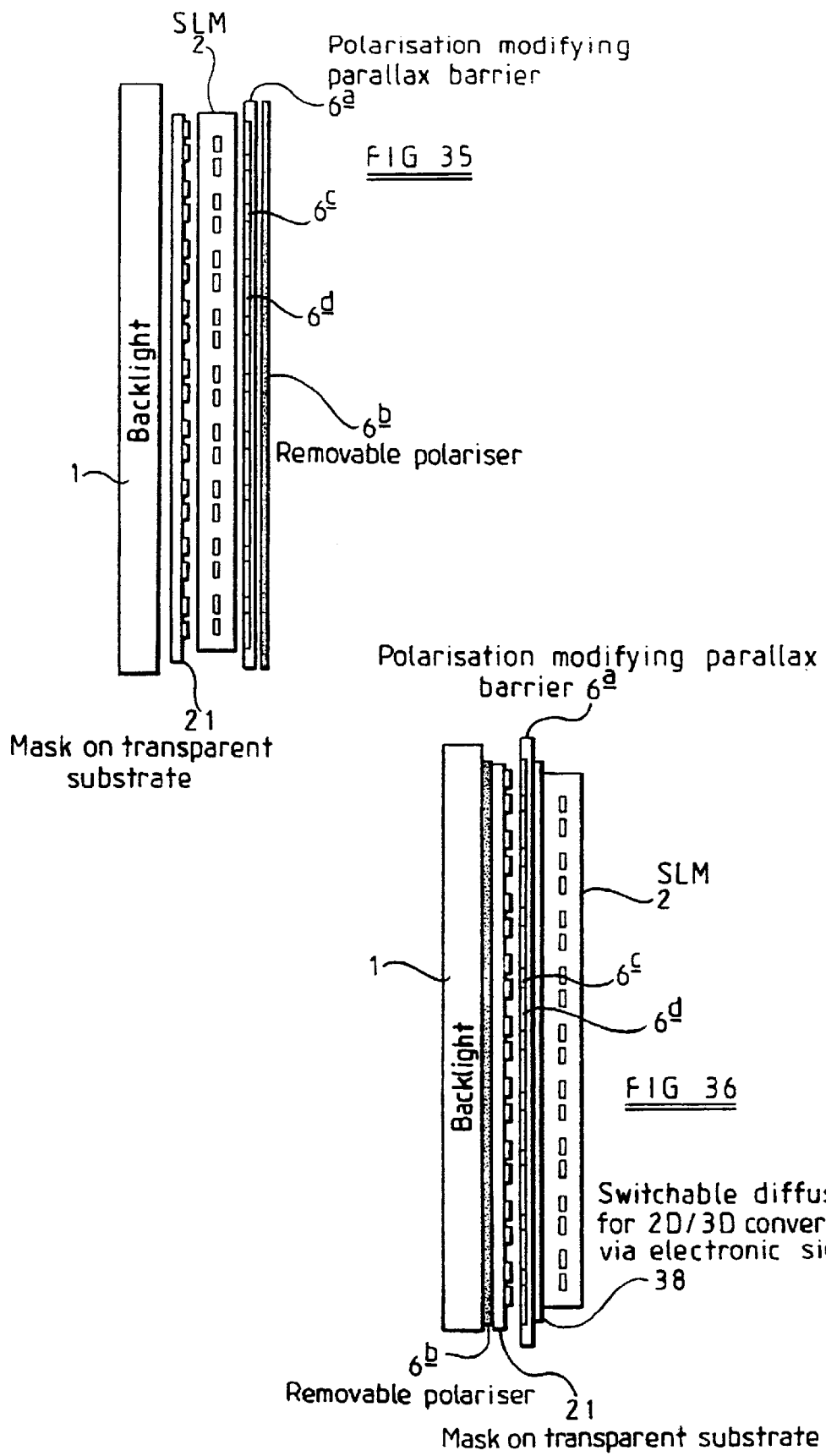

Mask and lenticular screen

Resultant illumination

LCD & parallax barrier

Resultant illuminations

Combination

Resultant combined illumination windows

DIRECTIONAL DISPLAY FOR A DIRECTIONAL DISPLAY HAVING AN ANGULAR INTENSITY PROFILE COMPENSATOR

TECHNICAL FIELD OF THE INVENTION

The present invention relates to a directional display, for instance of the autostereoscopic three dimensional (3D) type. Such displays may be used in office environment equipment, laptop and personal computers, personal entertainment systems such as computer games, 3D television, medical imaging, virtual reality, videophones and arcade video games. The present invention also relates to a method of making a mask for a directional display.

DISCUSSION OF THE RELATED ART

FIG. 1(a) is a horizontal cross-sectional diagrammatic view of a known type of autostereoscopic 3D display, for instance as disclosed in EP 0 625 861, EP 0 726,482 and EP 0 721 131. The display comprises a diffuse or Lambertian backlight 1 disposed behind a spatial light modulator (SLM) 2 in the form of a liquid crystal device (LCD). The SLM 2 comprises a plurality of picture elements (pixels) such as 3 and the pixels are arranged in groups of columns. In the example illustrated, there are three columns in each group to provide a three window display. The columns are laterally contiguous as disclosed in EP 0 625 561 and as illustrated in FIG. 3, where the pixels 3 have apertures defined by an opaque black mask 11. The edge 12 of each column of pixels is contiguous with the edge of the adjacent column. A lenticular screen 4 is disposed in front of the SLM 2 with each lenticule being aligned with a corresponding group of three columns of pixels.

In use, the columns of each group display vertical slices of three different two dimensional (2D) Images taken from different view points so that the 2D images are spatially multiplexed. Each lenticule such as 5 images light passing through the associated group of three pixel columns into wedge-shaped regions which form three viewing zones of a zeroth order lobe. Each lenticule 5 also images the groups of pixel columns aligned with an adjacent lenticule into repeated viewing zones of higher lobe order. The viewing zones are angularly contiguous.

In order to provide viewpoint correction 50 that each eye of the observer sees the same 2D view across the whole of the display, the pitch of the lenticules 5 of the lenticular screen 4 is slightly less than the pitch of the groups of pixel columns of the SLM 2. As illustrated in FIG. 2, the viewing zones thus define viewing windows 7 and 8 at the designed viewing distance of the display such that these windows lie in a plane parallel to the display and have the widest lateral extent at the window plane within the viewing zones. Provided the eyes 9 and 10 of the observer are located in adjacent viewing zones, for instance in adjacent windows 7 and 8, a 3D image is perceived without the need for the observer to wear viewing aids.

FIG. 1(b) shows another 3D autostereoscopic display which differs from that shown in FIG. 1 in that the lenticular screen 4 is replaced by a parallax barrier 6. Each of the lenticules 5 is thus replaced by a vertical slit which cooperates with the adjacent group of three pixel columns to define the viewing zones and the viewing windows of the zeroth order.

FIG. 1(c) discloses a display which differs from that shown in FIG. 1(b) In that the parallax barrier 6 is disposed between the SLM 2 and the backlight 1. The parallax barrier 6 is shown as being formed on a substrate of the SLM 2, GS 9616281.3 and EP97305757.3 disclose an SLM which is particularly suitable for use in rear-illuminated autostereoscopic displays. Diffraction of light caused by transmission through pixels of the SLM causes degradation of the viewing zones. In order to reduce the diffraction spreading of the transmitted light, a complex transmission profile is imposed on the pixel apertures to modify the aperture profile and reduce the higher angular orders of diffractive spreading, U.S. Pat. No. 4,717,949 discloses an autostereoscopic display which differs from that shown in FIG. 1(c) in that the backlight 1 and the parallax barrier 6 are replaced by an arrangement for forming a plurality of emissive light lines such as 13 as shown in FIG. 4. U.S. Pat. No. 5,457,574 discloses a specific arrangement for producing such lightlines as shown in FIG. 5. Light from a backlight 1 passes through a diffuser 14 and is collected by a Fresnel lens 15. The Fresnel lens 15 collimates the light from the backlight 1 and the diffuser 14 and supplies the collimated light to a lenticular screen 16. The lenticular screen 16 forms images of the diffuser 14 on a weak diffuser 17 so as to form the lightlines. Light from these lightlines is modulated by a spatial light modulator 2 and light efficiency is improved by another Fresnel lens 18 which restricts the illumination from the display to the region in space where an observer will be located.

Other known front lenticular screen and front parallax barrier autostereoscopic displays are disclosed in: G. R. Chamberlin, D. E. Sheat, D. J. McCartney, "Three Dimensional Imaging for Video Telephony", TAO First International Symposium, (December 1993); M. R. Jewell, G. R. Chamberlain, D. E. Sheat, P. Cochrane, D. J. McCartney, "3-D Imaging Systems for Video Communication Applications", SPIE Vol. 2409pp 4–10 (1995); M Sakata, C. Hamagishi, A. Yamasjita, K. Mashitani, E. Nakayama, "3-D Displays without Special Glasses by image-Splitter Method", 3D Image Conference '95; and JP 7-287196.

FIG. 6 illustrates the principle of operation of the rear parallax barrier display shown in FIG. 1(c). The parallax barrier is a flat opaque screen with a series of thin transmitting slits 19 having a regular lateral pitch c and forming vertical illumination lines behind the LCD 2 when the backlight 1 is activated. The LCD 2 comprises pixel columns having a regular lateral pitch p. A number N of images are interlaced in adjacent vertical columns of pixels on the LCD and the parallax barrier pitch is approximately given by:

$$c = Np. \qquad (1),$$

Therefore, for-each column of pixels, there is a defined range of angles of illumination as shown at θ due to the associated light line in the rear parallax barrier.

So that an observer's eye located in the optimum viewing plane can only see one of the interlaced images displayed on the LCD 2, the pitch of the rear parallax barrier is designed to be slightly greater than that given by equation (1) so that the range of angles of view for each pixel column converge on the optimum viewing position. This is shown by the rays traced in FIG. 7 for a display showing two images. This pitch correction is known as "viewpoint correction" and ensures that, at any given point on the viewing plane containing the viewing windows 7, 8, the parallax barrier slit 19 is visible at the same horizontal position within each pixel of one view. Moving laterally in the viewing plane causes the slit position to move within the pixels and ultimately be visible behind the adjacent columns of pixels. At this position the observer is in the next viewing zone. Hence the interlaced images and the parallax barrier 6 give rise to the viewing windows 7, 8, In the viewing plane within which only one view is visible across the whole of the display. The viewpoint corrected pitch of a rear parallax barrier may be calculated from σ=Np(1+t/nL)

where t is the separation of the pixel plane and the barrier slits, n is the composite refractive index of the medium in this spacing and L is the optimum viewing distance of the display.

The front parallax barrier display operates in a substntially similar way. In this case the pixels are occluded by opaque parts of the mask outside of the viewing zones and visible through the slits in the viewing zones. FIG. 8 shows the viewing geometry of such a system.

Geometrical arguments lead to a first approximation of the viewing window intensity profile. If the LCD 2 has rectangular pixels, the viewing windows have uniform illumination across their central region. The illumination profile at the edges is sloped linearly due to the partial occlusion of the rear slit as the lateral position in the viewing plane causes the parallax barrier slit to move under the pixel edge. Therefore a wide rear slit gives a gentle slope to the edge of the viewing window and a narrow rear slit gives sharp edged viewing regions. A compromise between window edge function and light throughput decides the optimum parallax barrier slit width. FIG. 9 shows the ideal geometrical viewing window intensity profile as given by the dimensions shown in FIG. 7.

If the pixel apertures us defined by the black mask in the LCD are not rectangular, then the viewing window profile is not this simple trapezoidal or "tent" shape. At different lateral positions within the viewing plane, the observer will see the light lines through different vertical aperture sizes within the pixel. Thus the viewing window intensity follows the vertical extent of the pixel apertures blurred by the finite rear slit width. FIG. 10 shows an example of this. Gaps between adjacent columns of pixels will lead to dark areas in the viewing plane due to total occlusion of the parallax barrier light lines.

The geometrical performance of such displays is modified by diffraction effects. Fresnel diffraction effects are observed in the near-fields at apertures or obstacles in an optical path. This either means that the observer is very close to the aperture/obstacle or the light source is close behind the aperture/obstacle. Both cases are analogous in that they take into account the curvature of the wavefront. Fraunhofer diffraction is a simplified theory of the far-field case of diffraction and can be obtained by various simplifications in the Fresnel analysis including neglecting wavefront curvature effects and assuming a plane wave approach. Rear and front parallax barrier displays generally cause very different diffraction effects. The effect of diffraction in rear parallax barrier displays will be described in detail hereinafter.

To give a typical example, in the rear parallax barrier display of FIG. 1(c), the observer is looking at pixel apertures of 90 μm width from 600 millimeters away. Therefore Fraunhofer diffraction would seem to be applicable for the light distribution caused by these. However, the action of the rear parallax barrier is to provide a defined source of light very close (1.3 mm) behind the pixel apertures.

Each point in the rear slit acts like a point source emitting spherical wavefronts due the diffuse rear illumination. As the slit is relatively narrow, these wavefronts do not combine to generate a plane wave across the pixel aperture width. Hence the illumination wavefront is not plane at the pixel aperture and Fresnel diffraction results. FIG. 11 shows this. If the rear slit was larger than the pixel aperture, then the wavefront across the pixel aperture would be essentially plane and Fraunhofer treatment would be appropriate.

The theory of Fresnal diffraction is covered in many appropriate textbooks, such as E. Hecht, "Optics", 2nd Ed. (Addison-Wesley, 1987).

The basic geometry is shown in FIG. 12 and consists of a point source at a distance $\rho_o$ behind an aperture of width w. A straight line connects the point to an observer P through the aperture (at 0) and defines an origin line. The observer is at a distance $r_o$ from the aperture. The contributions to the amplitude received by the observer are summed over the aperture taking into account the phase of the curved wavefront within the aperture.

To calculate the intensity pattern received on the observation plane, the SOP line is considered fixed and the aperture is offset relative to this to give the effect of the observer's motion. Thus the limits of integration for the aperture width are changed to follow the movement of the origin point 0 within the aperture. Full details are given in the textbooks but the final result for an infinitely long slit is as follows, The intensity l(x) received at the lateral position x in the observation plane is given by:

$$l(x)=|B(u1(x),u2(x))|^2$$

where u1 and u2 are the limits of integration for the Fresnel integrals and are defined as:

$$u1(x)=(x+w/2)[2(\rho_o+r_o)/(\lambda r_o \rho_o)]^{1/2}$$

$$u2(x)=(x-w/2)[2(\rho_o+r_o)/(\lambda r_o \rho_o)]^{1/2}$$

The Frennel Integrals themselves are given by:

$$B(u1(x),u2(x))=FR1(u2(x),u1(x))+IFR2(u2(x),u1(x))$$

where $$FR1(b, a) = \int_a^b \cos(\pi w^2/2)\, dw$$

$$FR2(b, a) = \int_d^b \sin(\pi w^2/2)\, dw$$

An example diffraction pattern from a 90 μm slit with a point source 1.3 mm behind viewed from 600 mm is given in FIG. 13. These parameters are typical for a current display system. The back working distance (1.3 mm) defines the wavefront curvature ($\rho_o$) of the incident light at the aperture. The pattern is complex with many sub-fringes.

The complete model for the viewing window intensity profile relies on the viewpoint correction between the rear parallax barrier 6 and the pixel layout as described hereinbefore. This pitch correction between the two components assures that, from the viewing plane, each pixel associated with a viewing window has a parallax barrier slit 19 behind it located in the same horizontal position relative to the pixel aperture 20. This horizontal offset changes as the observer moves laterally in the viewing plane as described above. The intensity received at a point in the viewing plane is the sum of the contributions from the Fresnel diffraction patterns produced by the pixels and, due to the viewpoint correction, every pixel gives the same contribution as the point source is located in the same position behind each pixel. Furthermore, as the observer moves laterally, the intensity pattern will follow the Fresnel diffraction pattern for a single slit. This is because movement in the viewing plane causes the slit to move behind every pixel by the same amount. This displacement of the source changes the diffraction effects which follow the diffraction profile calculated above. This is shown schematically in FIG. 14, Therefore, the viewing window intensity profile is merely a magnified version of the Fresnel diffraction pattern from a single slit and can therefore be expected to be non-uniform if significant diffraction is occurring The assumption of silt apertures in the theoretical treatment (as opposed to rectangular apertures which are closer to the actual pixel shape) is valid as the pixels add up in columns to give a long vertical extent and any diffraction in the vertical plane is washed out by this For a non-rectangular aperture a more complex treatment is appropriate which may be derived along the same lines as this simplified treatment. The finite width of the rear parallax barrier slits 19 needs to be taken into account however. This is done by considering the slit width to be an integration of point sources across itself and the final diffraction pattern is generated as the sum of the patterns from all the individual point sources.

Mathematically this integration is combined with the Fresnel diffraction integration by a convolution defined as follows The Fresnel pattern l(x) is convolved with a top-hat function R(x) which mirrors the rear slit transmission function to give the viewing window profile V(x) in the usual manner;

$$V(x) = \int_{-\infty}^{\infty} l(t)R(t-x)dt$$

The window profile produced after convolution with the rear slit width is shown in FIG. 15. This profile is generated from the data used in FIG. 13 and a rear slit width of 25 $\mu$m, again a typical figure for a practical display.

Another complication is that the incident light is not monochromatic but is white. The theory assumes monochromatic light and a second convolution due to the range of wavelengths should strictly be performed. This is not accounted for in the present mathematics but would lead to a slight further blurring of the pattern.

SUMMARY OF THE INVENTION

According to a first aspect of the invention, there is provided a directional display comprising a display arrangement for producing a plurality of viewing zones, each of which has a non-uniform first angular intensity profile with a first angularly varying component, characterised by a compensator for superimposing in the viewing zones a second angular intensity profile having a second angularly varying component which is substantially the inverse of the first angularly varying component.

The display arrangement may comprise a spatial light modulator having a plurality of picture elements and an array of discrete light sources. The picture elements may be arranged as columns and the light sources may comprise parallel evenly spaced line sources The light sources may comprise a diffuse backlight and a parallax barrier, The parallax barrier may comprise a plurality of slits, each of which cooperates with a respective group of the picture element columns to form the viewing zones of a zeroth order lobe.

The picture elements may be of substantially constant vertical aperture, the spatial light modulator and the parallax barrier may cooperate to produce Fresnel diffraction and the compensator may be arranged to compensate for the non-uniform first angular intensity profile caused by the Fresnel diffraction.

The picture elements may be of non-constant vertical aperture, the spatial light modulator and the parallax barrier may cooperate to produce Fresnel diffraction, and the compensator may be arranged to compensate for the non-uniform first angular intensity profile caused by the non-constant vertical aperture and the Fresnel diffraction.

The compensator may comprise a mask disposed between the parallax barrier and the backlight and comprising a plurality of strips of varying light transmissivity which cooperate with the slits of the parallax barrier to form the second angularly varying intensity profile.

The strips may be of substantially the same width as the picture element columns.

The ratio of the lateral pitches of the strips and the slits may be substantially equal to the ratio of the lateral pitches of the slits and the groups of the picture element columns.

The parallax barrier and the mask may be formed on opposite faces of a common transparent substrate.

$n_1 t_1$ may be equal to $n_2 t_2$, where $n_1$ is the effective refractive index between the spatial light modulator and the parallax barrier, $t_1$ is the thickness between a picture element plane of the spatial light modulator and the parallax barrier, $n_2$ is the effective refractive index between the parallax barrier and the mask, and $t_2$ is the thickness between the parallax barrier and the mask.

A lenticular screen may be disposed between the mask and the parallax barrier. The lenticular screen may comprise a plurality of lenticules, each of which is aligned with a respective strip of the mask.

A switchable diffuser may be disposed between the spatial light modulator and the array of light sources and may be switchable between a diffusing mode and a substantially non-diffusing mode. The switchable diffuser may comprise a polymer dispersed liquid crystal layer.

The display arrangement may comprise a diffuse backlight, a parallax barrier, and a spatial light modulator disposed between the backlight and the parallax barrier.

The spatial light modulator may comprise a plurality of picture element columns and the parallax barrier may comprise a plurality of parallel evenly spaced slits, each of which cooperates with a respective group of the picture element columns to form the viewing zones of a zeroth order lobe.

The compensator may comprise a mask comprising a plurality of strips of varying light transmissivity, the parallax barrier may be disposed between the spatial light modulator and the mask, and each strip may cooperate with a respective slit to form the second angularly varying intensity pattern.

The compensator may comprise means for defining the aperture transmission properties of the picture elements.

The defining means may comprise a spatial light modulator black mask defining the shape of picture element apertures.

The defining means may spatially vary the transmissivity of picture element apertures The parallax barrier may comprise a first polariser, a second polariser and a polarisation modifying layer disposed between the first and second polarisers and having slit regions and barrier regions for supplying light of orthogonal polarisations.

The second polariser may comprise part of the spatial light modulator.

The first polariser may be removable to provide a nondirectional mode of operation.

According to a second aspect of the invention, there is provided a method of making a mask for an embodiment of the display according to the first aspect of the invention, comprising disposing a photosensitive material in a plane substantially parallel to the spatial light modulator and intersected by the viewing zones, operating the display with the picture elements being transmissive so as to expose the photosensitive material, and reducing and repeating the image recorded by the photosensitive material.

The parallax barrier may be replaced by a further parallax barrier of reduced slit width during exposure of the photosensitive material.

The display may be viewpoint corrected to form viewing windows in a preferred viewing plane and the photosensitive material may be disposed at the viewing windows.

The mask may be formed on a transparent substrate of the parallax barrier.

According to a third aspect of the invention, there-is provided a method of making a holographic mask for an embodiment of the display according to the first aspect of the invention of the viewpoint corrected type forming viewing windows in a preferred viewing plane, comprising disposing a photosensitive material at a parallax barrier plane with respect to the spatial tight modulator, and exposing the photosensitive material by uniformly illuminating the viewing windows and supplying a front reference beam.

According to a fourth aspect of the invention, there is provided a method of making a holographic mask for an embodiment of the display according to the first aspect of the invention and of the viewpoint corrected type forming viewing windows in a preferred viewing plane, comprising disposing a photosensitive material in a parallax barrier position with respect to the viewing windows and exposing the photosensitive material by illuminating the viewing windows with a first intensity profile having a first spatially varying component which is substantially the inverse of a second spatially varying component of a second intensity profile produced by the display without the compensator and by supplying a front reference beam.

It is thus possible to provide a display which allows viewing zones and viewing windows to be generated with substantially improved uniformity of light intensity profile. For instance, variations caused by Fresnel diffraction can be substantially reduced, Further, for display arrangements having a pixel shape of non-constant vertical extent or aperture, the resulting illumination non-uniformity may also be substantially reduced. This allows SLMs having pixels of arbitrary shapes, such as existing SLMs, to be used, for instance in flat panel directional displays, while still producing a substantially uniform intensity of illumination within the viewing zones or viewing windows.

Such displays allow an observer to move laterally, for instance within the optimum viewing plane, without perceiving substantial variations in display brightness. For such displays which track movements of an observer, undesirable flicker artefacts are substantially reduced. Further, even if an observer is not located in the optimum-viewing plane, improvements in uniformity of display brightness over the whole display can be achieved. Also, freedom of viewing is extended laterally and longitudinally.

By compensating for diffraction effects within a display arrangement, the slit size of a rear parallax barrier may be reduced, This provides sharper edged viewing windows and provides greater viewing freedom.

It is also possible to provide a display which is switchable between 2D and 3D modes of operation, for instance using a switchable diffuser. Such a display has the advantages described hereinbefore in the 2D mode as well as in the 3D mode

BRIEF DESCRIPTION OF THE DRAWINGS

The invention will be further described, by way of example, with reference to the accompanying drawings, in which:

FIG. 1(a) illustrates a known flat panel autostereoscopic 3D display having a front lenticular screen;

FIG. 1(b) illustrates a known flat panel autostereoscopic 3D display having a front parallax barrier;

FIG. 16 shows structures and resulting light intensity profiles for illustrating an embodiment of the invention;

FIG. 17 is similar to FIG. 16 for another embodiment of the invention;

FIG. 18b is a diagrammatic plan view of a modified display of the type. shown in FIG. 18a;

FIG. 22b illustrates a first type of master for use in the method illustrated in FIG. 22a;

FIG. 22c illustrates a second type of master for use in the method illustrated in FIG. 22a;

FIG. 31 is a diagrammatic plan view of a display constituting an embodiment of the invention;

FIG. 32 illustrates diagrammatically a method of making a mask constituting an embodiment of the invention;

FIG. 35 is a diagrammatic plan view of a display constituting an embodiment of the invention;

FIG. 36 is a diagrammatic plan view of a display constituting an embodiment of the invention;

FIG. 39b illustrates the illumination profile of the part of the display shown in FIG. 39a;

FIG. 40b illustrates the degree of visibility of pixels of the part shown in FIG. 40a;

FIG. 41a is a plan view of a display comprising the parts shown in FIG. 39a and 40a;

FIG. 41b illustrates the illumination profile of viewing windows of the display of FIG. 41a;

FIG. 42b illustrates the illumination profile of the part of the display show in FIG. 42a;

FIG. 43b illustrates the degree of visibility of pixels of the part shown in FIG. 43a;

FIG. 44a is a plan view of a display comprising the parts shown in FIG. 42a and 43a; and FIG. 44b illustrates the illumination profile of viewing windows of the display of FIG. 44a.

DETAILED DESCRIPTION OF THE INVENTION

Figure 1C:
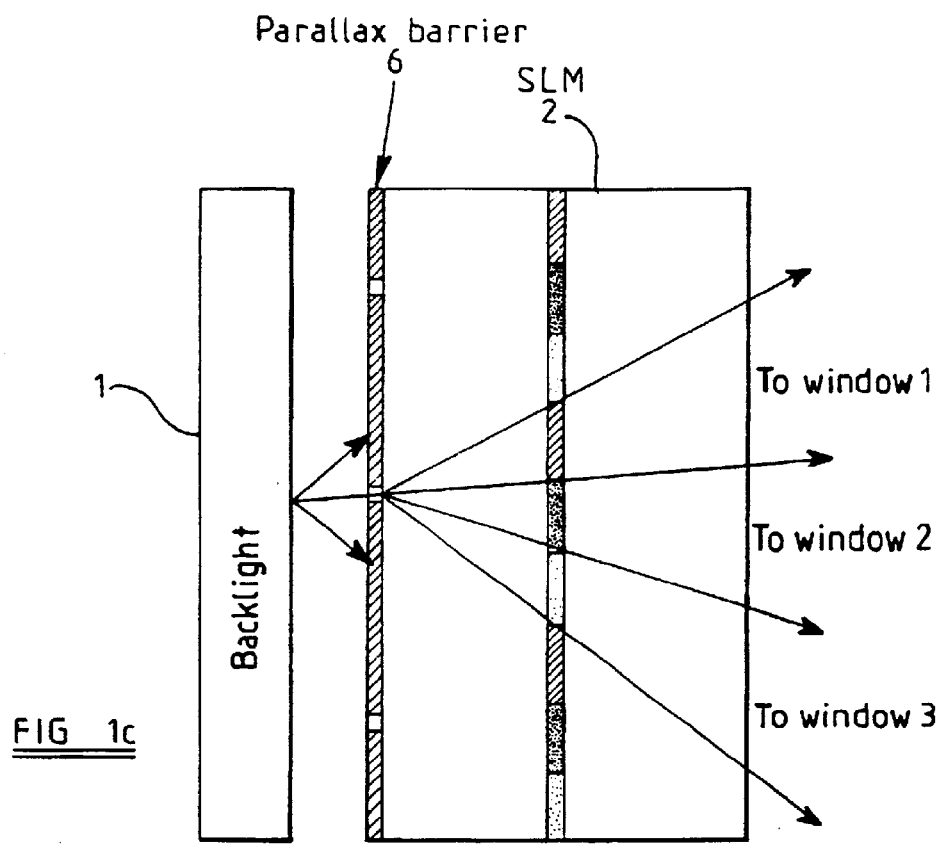
FIG. 1(c) illustrates a known flat panel autostereoscopic 3D display having a rear parallax barrier.
Figure 2:
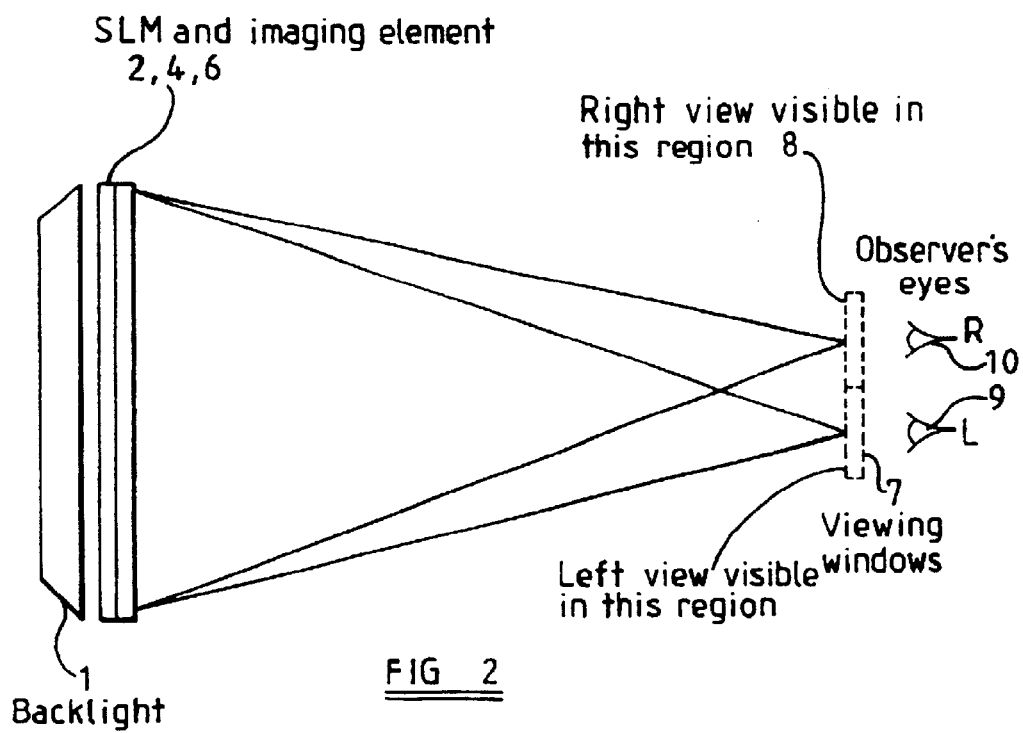
FIG. 2 is a diagram illustrating the formation of viewing regions in an autostereoscopic display.

Like reference numerals refer to like parts throughout the drawings.

The upper row of. FIG. 16 illustrates a display arrangement which comprises an SLM 2 and a rear parallax barrier 6 and which forms part of an autostereoscopic 3D display. The corresponding light intensity profile formed in a viewing window by the display is illustrated to the right as light intensity against lateral position of the observer. Thus, the intensity varies significantly across the viewing window. Observers are sensitive to a change in illumination of less than 2% across the whole display area if in the viewing plane. Outside the viewing plane, where the variations are seen across the display surface, observers can discern illumination changes of less than 0.5%.

The middle row of FIG. 16 illustrates an angular intensity corrector element 21 and the corresponding intensity profile produced by the element 21 at the viewing window. The element 21 may, for instance, comprise a mask component and a parallax barrier which cooperate together in, the same way as the SLM 2 and the parallax barrier 6 to generate the same viewing zones and windows The mask has a light transmissivity which is such that the illustrated intensity profile is created at the viewing window.

The intensity profile created by the parallax barrier 6 and the SLM 2 includes a component which varies spatially across the viewing window. Similarly, the element 21 produces a profile having a spatially varying component which is substantially the inverse of the spatially varying component produced by the SLM 2 and the parallax barrier 6. As shown at the bottom of FIG. 16, the intensity profiles are superimposed so as to reduce or substantially cancel the spatially varying components within at least the main part of the viewing window. Thus, the effects of diffraction and of variations in the vertical aperture of pixels are substantially reduced so that any residual light intensity variations resulting from relative movement between an eye of an observer and a viewing window can be made sufficiently small so as not to result in undesirable visual artefacts.

Figure 3:
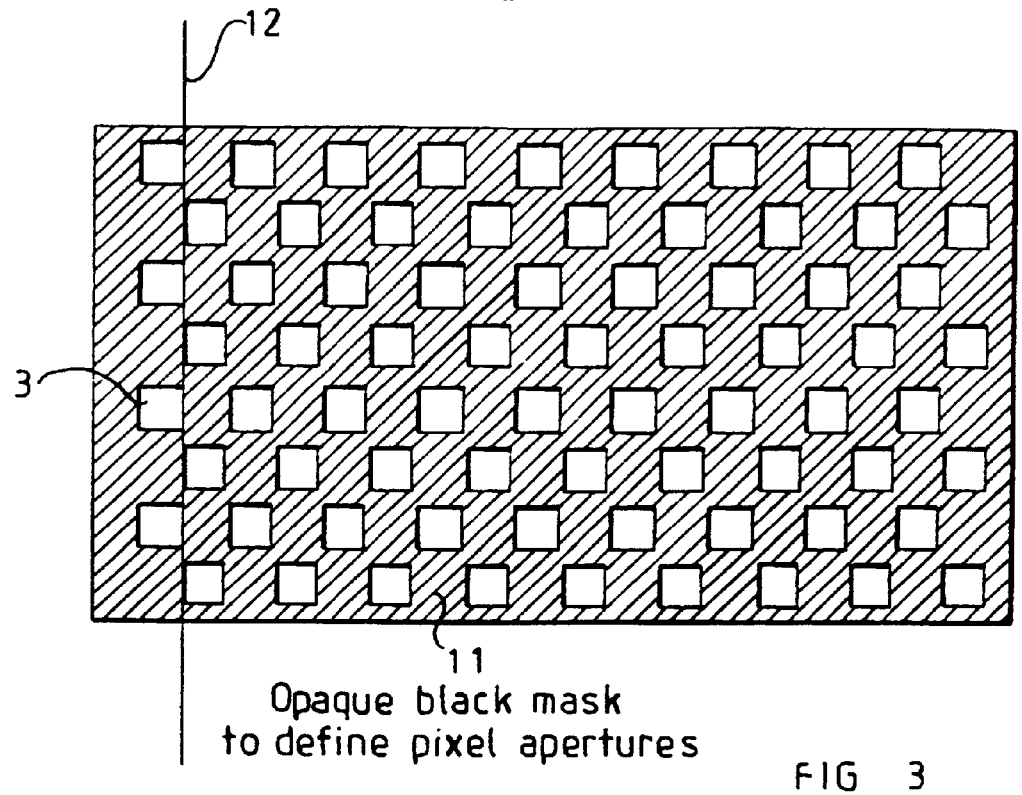
FIG. 3 illustrates a known layout of pixels in an SLM.
Figure 4:
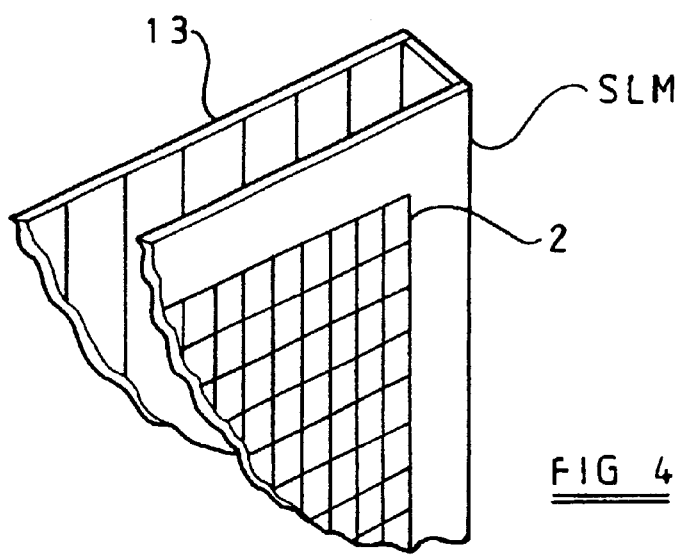
FIG. 4 illustrates a known autostereoscopic 3D display.
Figure 5:
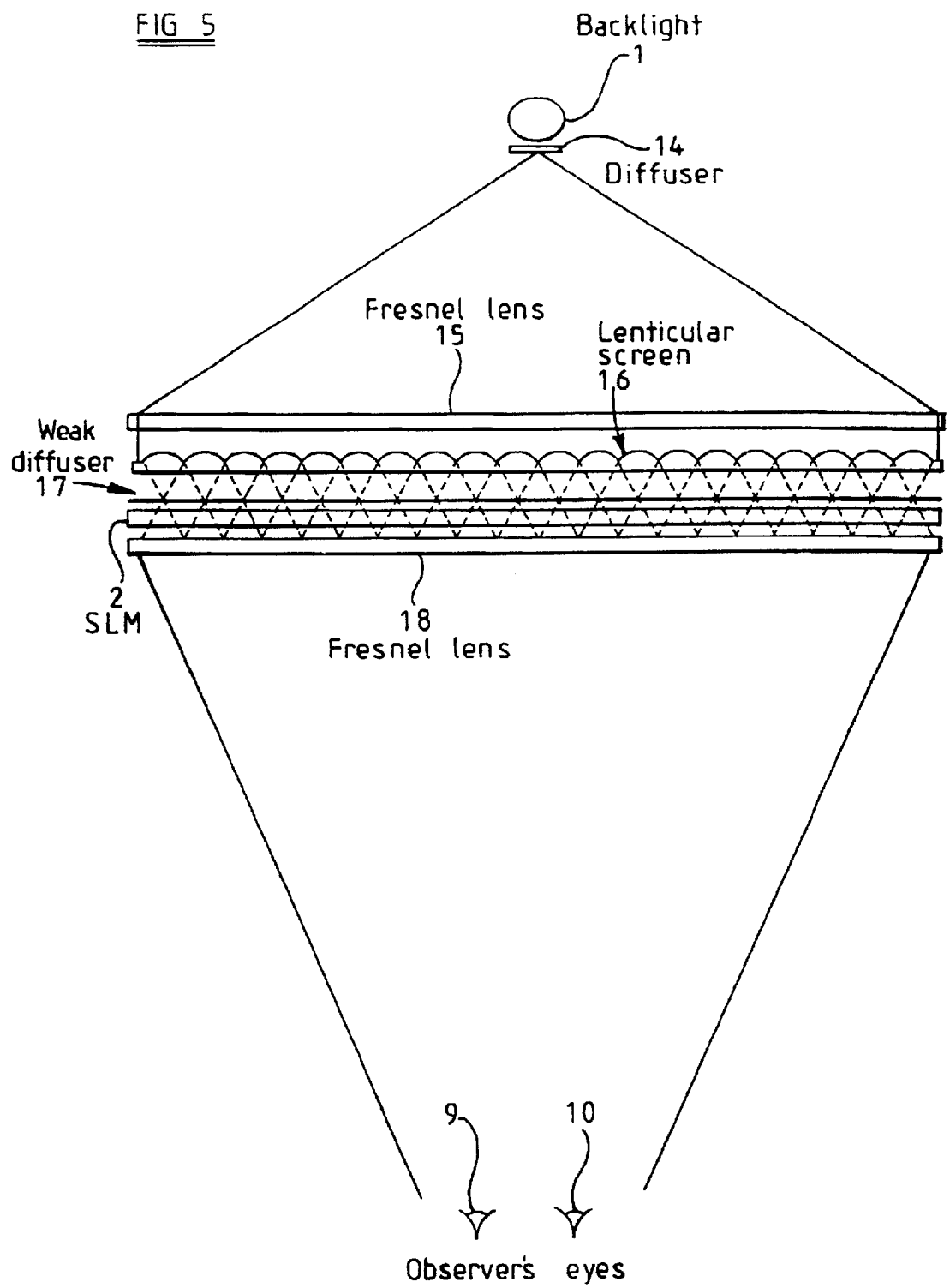
FIG. 5 is a diagrammatic plan view of another known autostereoscopic 3D display.
Figure 6:
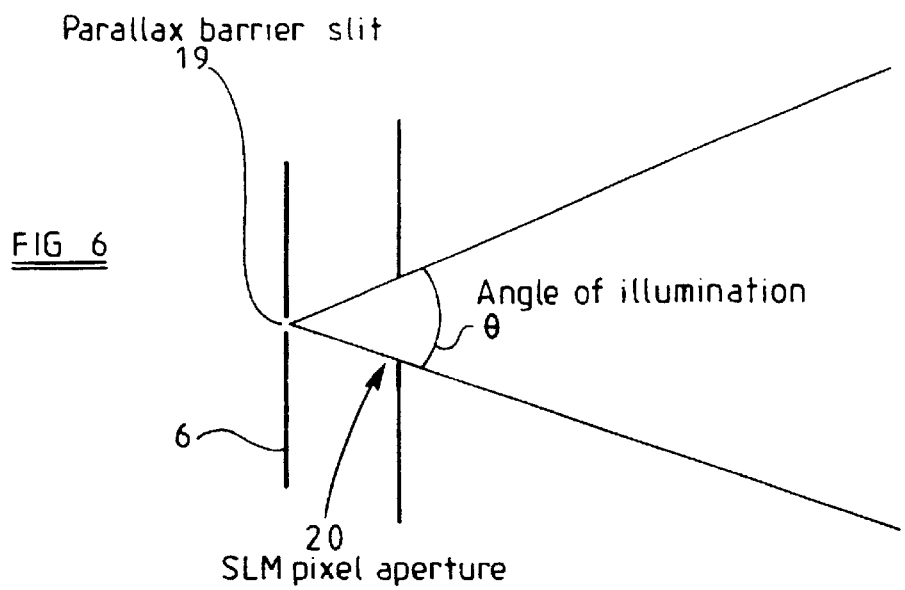
FIG. 6 is a diagram illustrating an angle of illumination produced by a rear parallax barrier slit.
Figure 7:
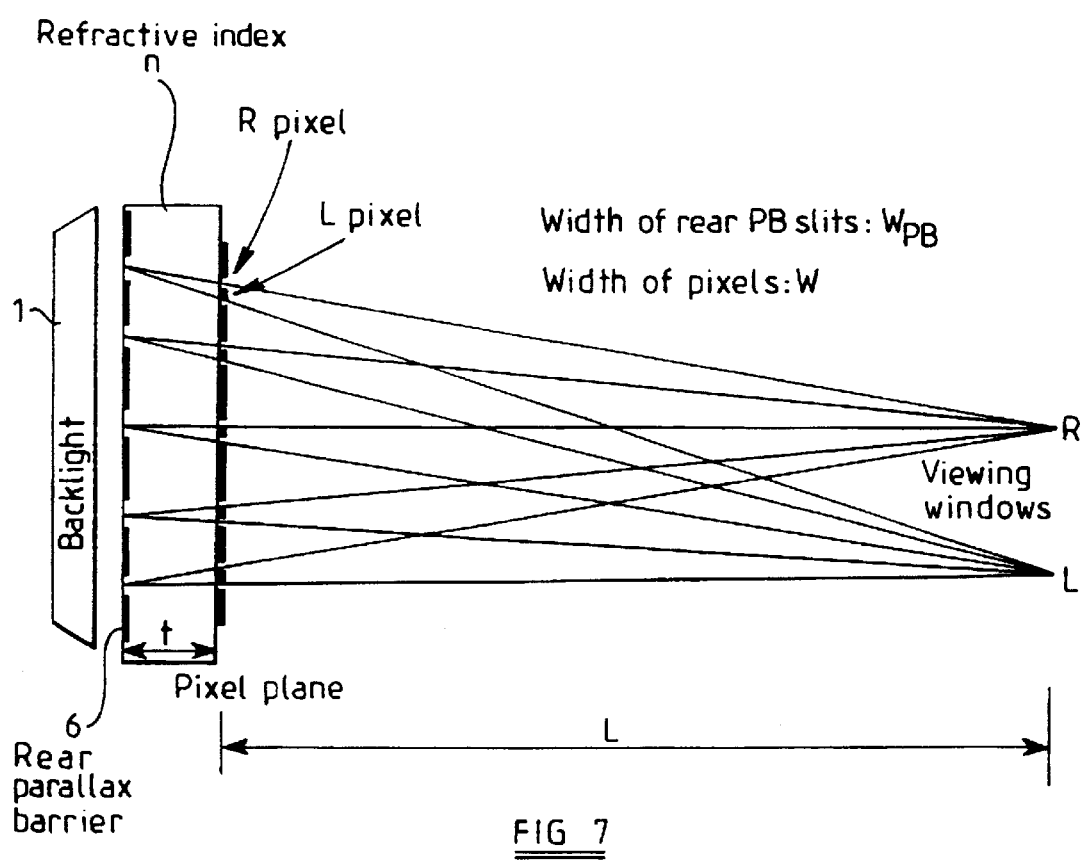
FIG. 7 illustrates the generation of viewing zones by viewpoint correction in a rear parallax barrier-display.
Figure 8:
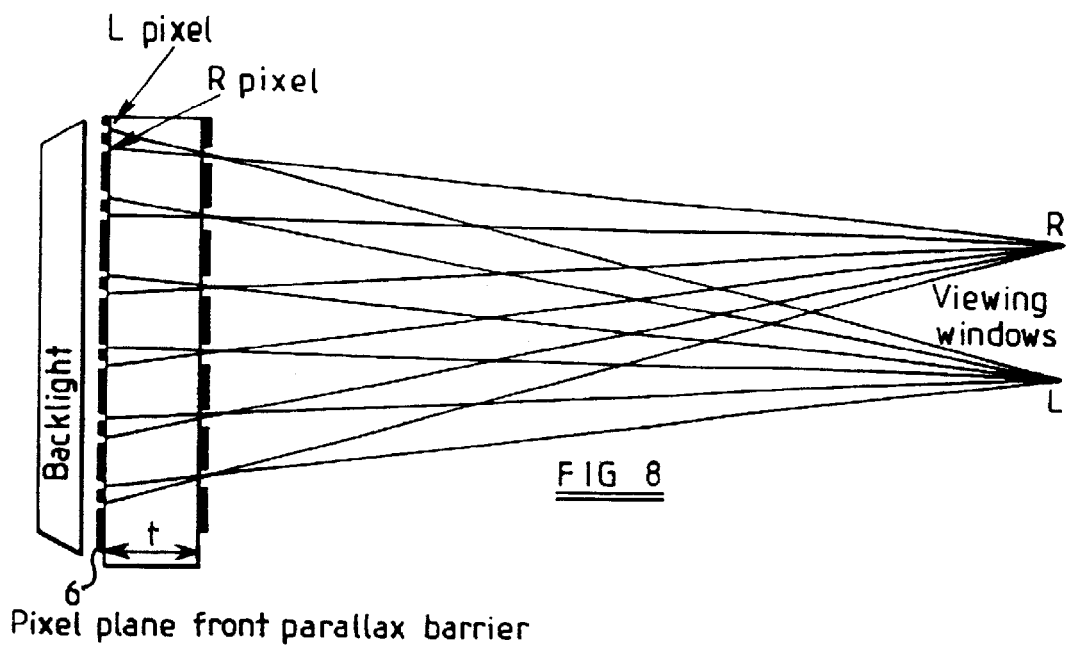
FIG. 8 illustrates the generation of viewing zones by viewpoint correction in a front parallax barrier display.
Figure 18A:
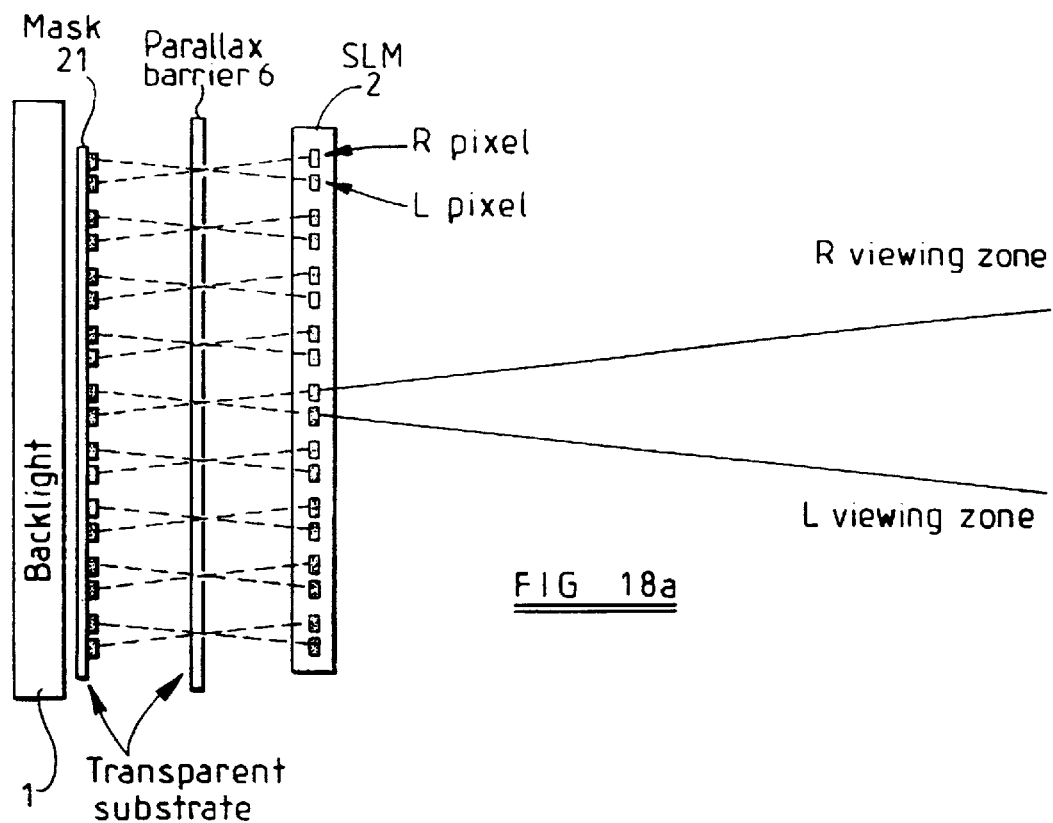
FIG. 18a is a diagrammatic plan view of a display constituting an embodiment of the invention.
Figure 19:
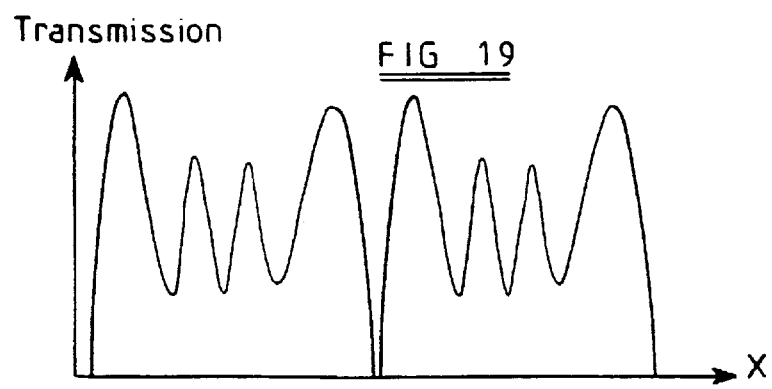
FIG. 19 is a graph of transmission against lateral position illustrating a transmission profile of a part of a mask.

As shown in FIG. 17, the corrector element 21 may be embodied as a mask which cooperates with the rear parallax barrier 6 so as to compensate for the effects of diffraction and, when present, of pixels of varying vertical aperture. Such an arrangement is illustrated in more detail in FIG. 18a. The display shown in FIG. 18a is of the rear parallax barrier type as shown in FIG. 1(c). The mask 21 is disposed between the parallax barrier 6 and the backlight 1 and comprises a plurality of vertical strips having light transmissivities as illustrated in FIG. 19 for two adjacent strips. The display is of the type producing two viewing zones so that each slit of the parallax barrier. 6 cooperates with two columns of pixels of the SLIM 2. Similarly, each slit of the parallax barrier 6 cooperates with two strips of the mask 21. The pixels of the SLM 2 are of rectangular cross-section and so have constant vertical apertures. Pixel arrangements of the type shown in FIG. 3 are suitable. The spatially varying transmissivities of the strips of the mask 21 are thus designed to compensate only for the Fresnel diffraction produced by the parallax barrier slits and the pixels of the SLM 2.

The width of each strip of the mask 21 is made substantially equal to the width of the associated column of pixels of the SLM 2. The pitches of the pixel columns of the SLM 2, the slits of the parallax barrier 6 and the strips of the mask 21 are selected so as to provide a viewpoint corrected display as described hereinbefor.

In order for the effects of the mask and diffraction to cancel over the whole of the viewing region, the windows formed by the mask 21 and the parallax barrier 6 must have the same size and optimum viewing plane as the windows formed by the parallax barrier 6 and the SLM 2, To achieve this, the optical path length between the mask 21 and the parallax barrier 6 must be the same as that between the parallax barrier 6 and the SLM 2. Thus, if $n_1$ and $n_2$ are the effective refractive indices of the regions between the SLM 2 and the parallax barrier 6 and between the parallax barrier 6 and the mask 21, respectively, and to and $t_2$ denote the two thicknesses of the corresponding regions, then this condition is satisfied when:

$$n_1 t_1 = n_2 t_2$$

If the relative pitches are then viewpoint corrected for the same optimum viewing plane, the combination of the mask 21 and the parallax barrier 6 and the combination of the parallax barrier 6 and the SLM 2 interact correctly and the windows in all display lobes are superimposed.

The addition of two imaging parallax systems is valid in terms of diffractive effects. Diffraction in the mask 21 is irrelevant because it is illuminated by a Lambertian backlight 1 which contains light travelling in all directions.

Because the mask strips are wider than the parallax barrier slits, the input wavefront to the parallax barrier slits is essentially plane and the narrowness of the slits ensures that strong Fresnel diffraction does not occur until the apertures of the SLM pixels. Thus, the imaging of the "balancing" windows from the mask 21 will occur with good definition in balance with the diffractive effects at the pixels of the SLM 2, The mask profile can be altered slightly to take into account any diffraction at the slits if necessary.

Figure 18B:
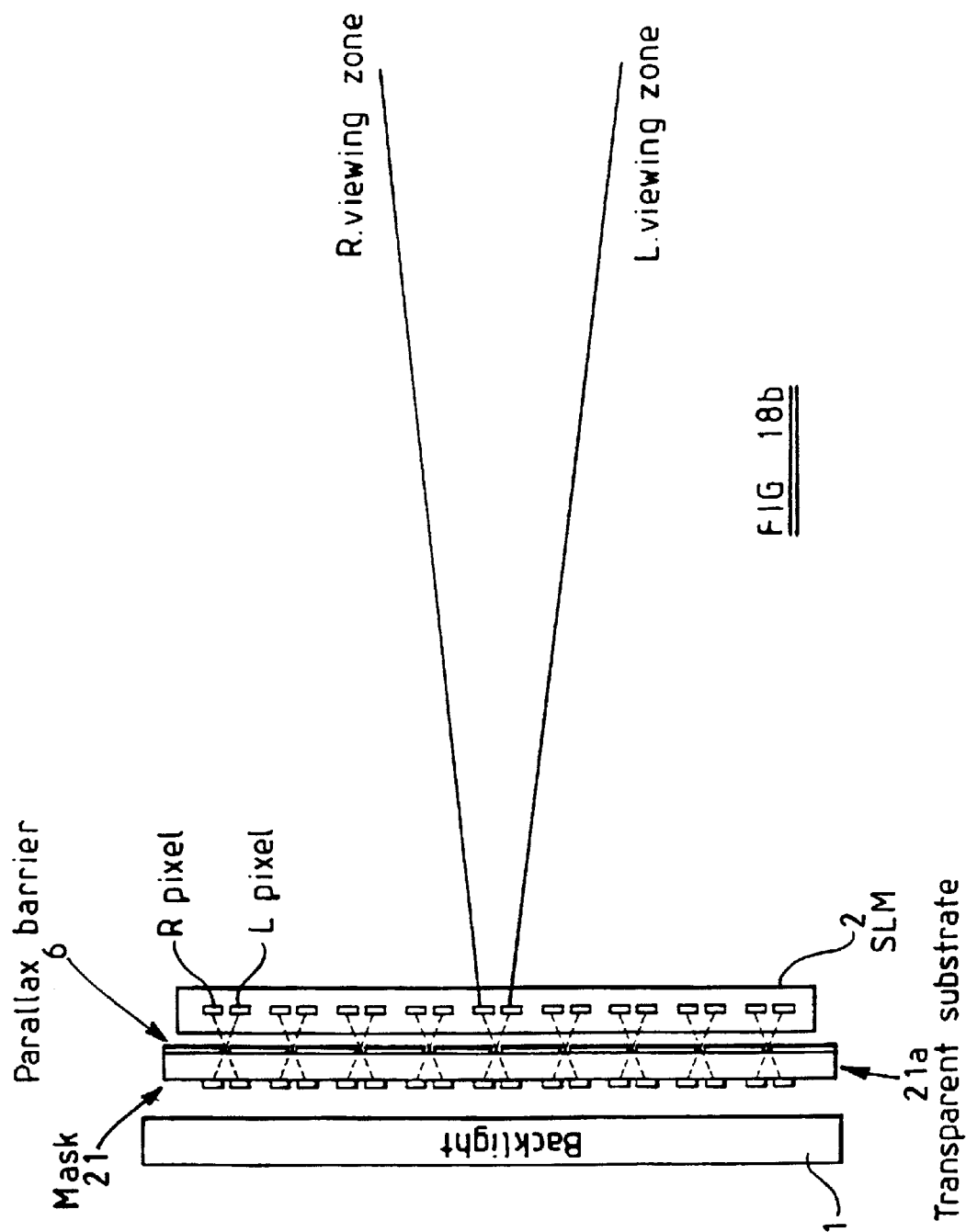

FIG. 18b shows a rear parallax barrier display of the type shown in FIG. 18a. In this case, the parallax barrier 6 and the mask 21 are formed on opposite faces of a common transparent substrate 212.

Figure 20:
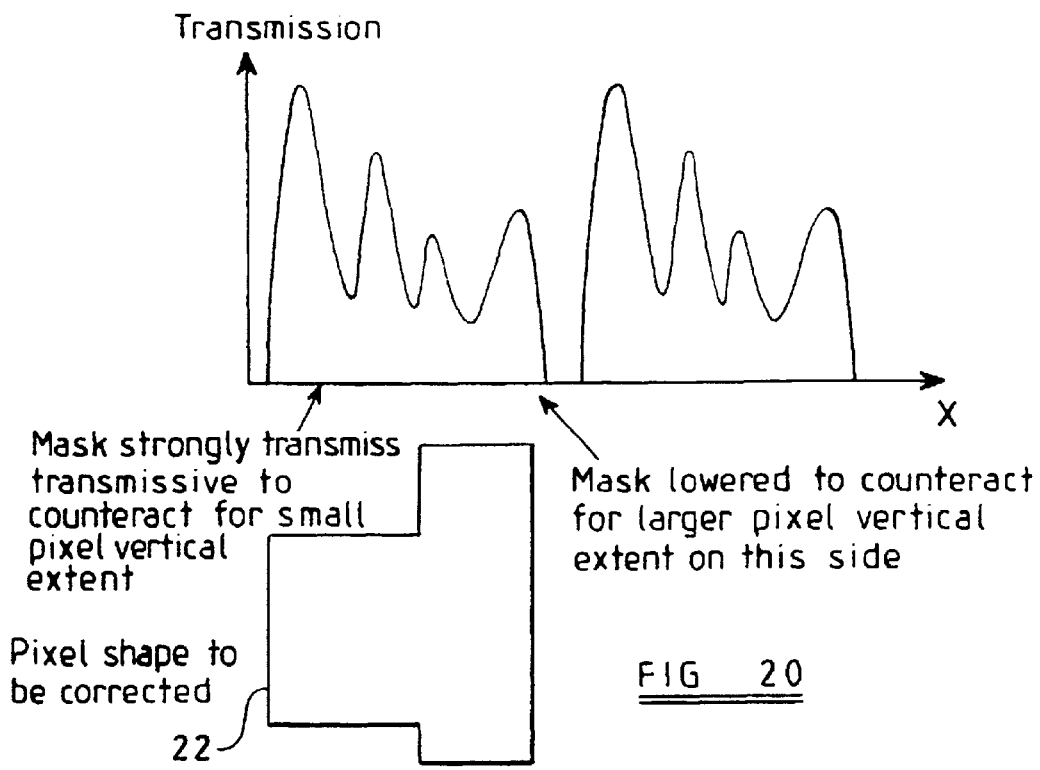
FIG. 20 is similar to FIG. 19 for another mask component.

FIG. 20 illustrates a pixel shape 22 of non-constant vertical aperture and the resulting transmission profile of the mask strips to compensate both for the effects of diffraction and the effects of the non-constant vertical aperture of the pixel. Thus, the use of the mask 21 can allow non-ideal pixel aperture shapes to be used while providing a substantially uniform illumination profile within the viewing windows. It is therefore possible to use conventional LCDs whose pixel aperture shapes would otherwise render them unsuitable for this type of display.

The spatial transmission profile of the mask may be decided by the calculations given hereinbefore for the window intensity profiles. Alternatively, empirical techniques may be used. The finite width of the parallax barrier slits causes a blurring of the profile generated by the mask 21 and the parallax barrier 6 alone in the same way as the finite size of the parallax barrier slits causes blurring in the Fresnel diffraction pattern.

Thus, the spatial profile of the mask 21 is the inverse of the unconvolved diffraction pattern from the SLM pixels. Any correction for SLM pixels of non-uniform vertical aperture is imposed as necessary on top of this. The finite width of the parallax barrier slits then blurs this to become the same as the convolved diffraction pattern from the SLM pixels.

Figure 21:
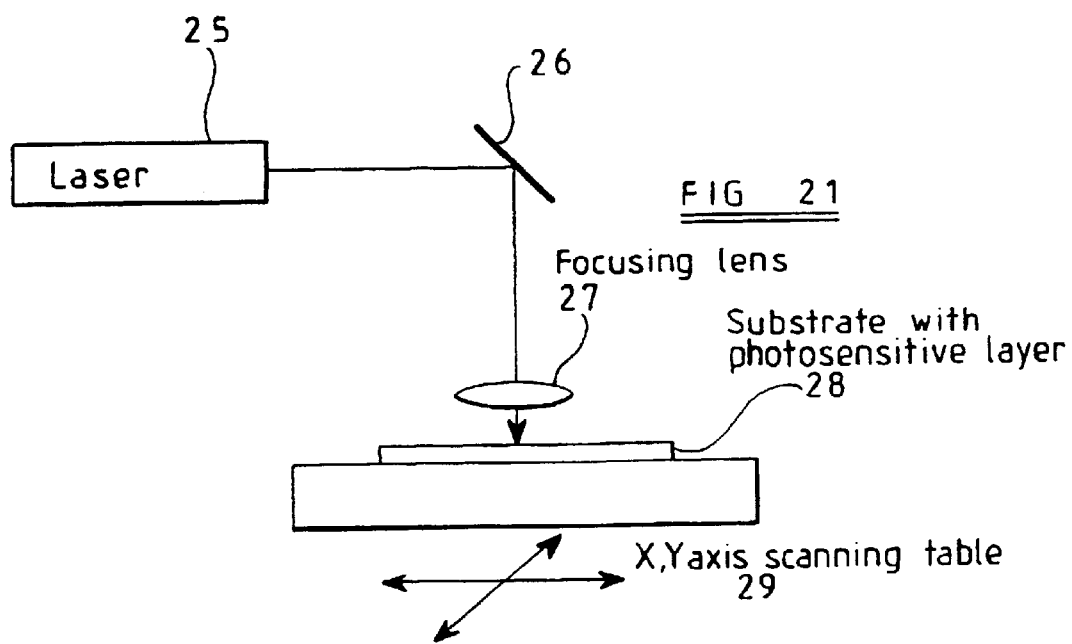
FIG. 21 is a diagram illustrating a method of making a mask.

In the case of a colour display, each pixel may have a colour filter associated with it. If the pixels are arranged in columns of like colours, then the part of the mask which cooperates with each column of pixels can be tuned to be most accurate for the corresponding colour of light, The mask 21 may be made by photographic or lithographic techniques, for example, in a photosensitive layer on a transparent substrate, which may comprise the substrate on which the parallax barrier 6 is formed. One technique for forming such a mask is to use a precision scanning system to move the substrate relative to a tightly focused laser spot. Such an arrangement is illustrated in FIG. 21. A laser 25 whose light output amplitude can be modulated produces a light beam which is reflected by a mirror 26 to a focusing lens 27. A substrate 28 carrying a photosensitive layer is mounted on a scanning table 29 which can be scanned in X and Y directions. As the XY scanning proceeds, the output of the laser 25 is modulated so as to modulate the exposure of the photosensitive layer on the substrate 25 in order to form the desired spatial transmission properties of the mask 21.

Figure 22A:
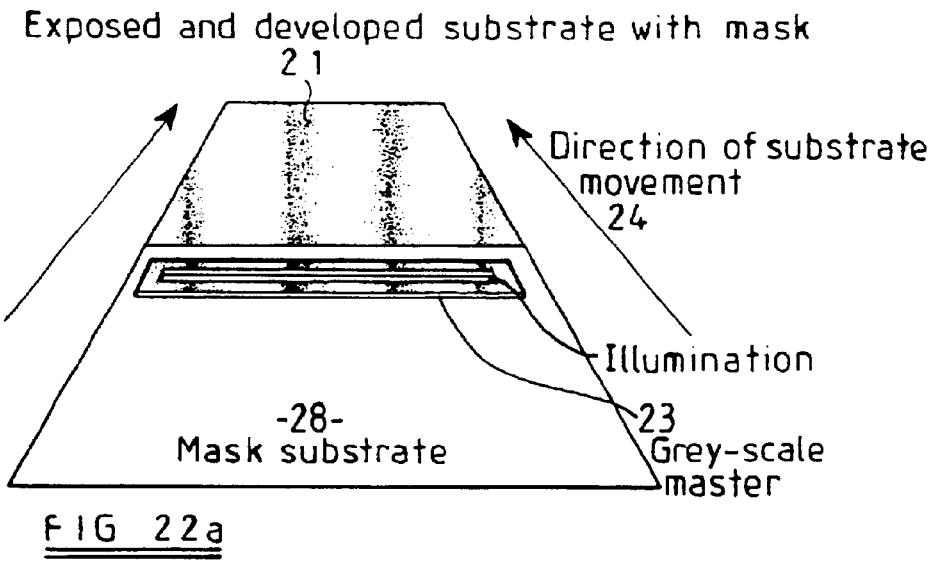
FIG. 22a illustrates diagrammatically a method of making a mask constituting an embodiment of the invention.
Figure 22B:
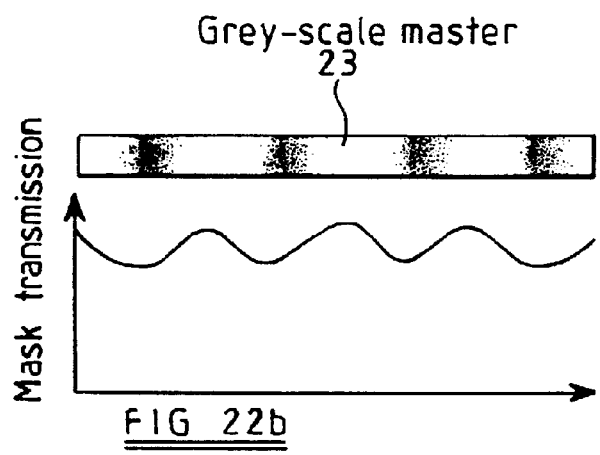

FIG. 22a illustrates another method of making the mask 21. A mask substrate 28 of the same type as that shown in FIG. 21 is moved in a direction 24 while being exposed to illumination through a grey-scale master 23. The master 23 is in the form of a slit having a light transmissivity which varies longitudinally of the slit as illustrated in FIG. 22b. The grey-scale master 23 may be made by any suitable technique, for instance as disclosed herein.

The master 23 is illuminated with a constant even intensity of illumination and the mask substrate 28 is moved at constant speed in the direction 24. The grey-scale produced by the mask 23 and used to expose the substrate 28 is thus constant so that the level of exposure of the substrate 28 at each point along the length of the slit of the master is likewise constant. Following development, the mask 21 having the appropriate transmissive properties is produced.

Figure 22C:
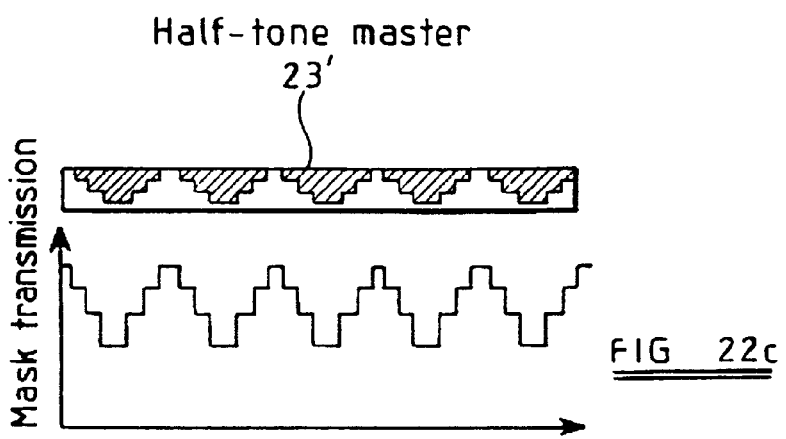

FIG. 22c illustrates at 23' a half-tone master which may be used in place of the grey-scale master 23 in FIG. 22a. The half-tone master 23' has a binary transmission pattern such that the exposure of the substrate 28 at each point along the slit is proportional to the length of the clear part of the slit transverse to its longitudinal axis. Such a half-tone master 23' may be easier to manufacture, for instance by conventional printing techniques. For instance, such masters may be used to expose very large sheets of the substrate 28 on an industrial web. The substrates may then be cut to the required size and the manufacturing cost may therefore be reduced.

Figure 23:
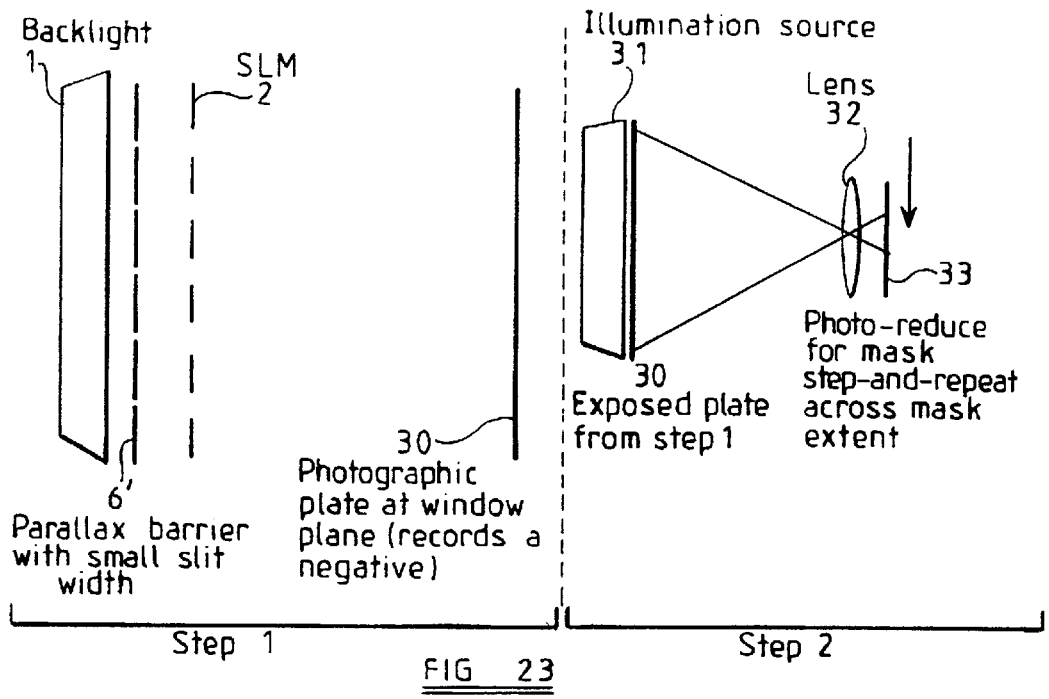
FIG. 23 illustrates diagrammatically a method of making a mask constituting an embodiment of the invention.

FIG. 23 illustrates another method of making the mask 21. The display In which the mask is to be provided, or a display of the same type for use only in manufacturing the masks, is provided with the parallax barrier 6 being replaced by a parallax barrier 6' having slits of the same pitch but of smaller width. The SLM 2 is controlled so as to be fully transmissive and a photographic plate 30 is disposed in the window plane of the display. The backlight 1 is then switched on so as to expose the plate 30. The resulting diffraction pattern is thus recorded, as seen magnified by the Moire effect, at the window plane.

In step 2, the exposed and processed plate 30 from step 1 is illuminated by an illumination source 31 and the image is reduced by an optical system shown as a lens 32. The reduced image is, formed on a suitable substrate 33, The illumination source 31 is switched off and the substrate 33 stepped forward for this process to be repeated. By means of this step and repeat process, the required pattern -is photographically reduced and replicated across the mask. Alternatively, a lenticular screen may be used in place of the lens 32 to perform the optical imaging and repetition across the mask allowing a single exposure to record the mask strips across the whole of the substrate 33.

The brightness and contrast levels in the photographic processes should be appropriately adjusted to give the desired grey-scale levels in the final mask 21. The spot sizes used for illumination in the first step are significantly smaller than the slit size of the parallax barrier 6 in the final display so as to avoid blurring the recorded pattern.

As mentioned hereinbefore, the mask 21 may be manufactured on a separate substrate or on an existing substrate. For instance, the mask may be formed on one side of a transparent substrate and the parallax barrier on the other side as shown in FIG. 18b. This arrangement provides a rugged design by eliminating any possible relative movement of the two components.

Figure 24:
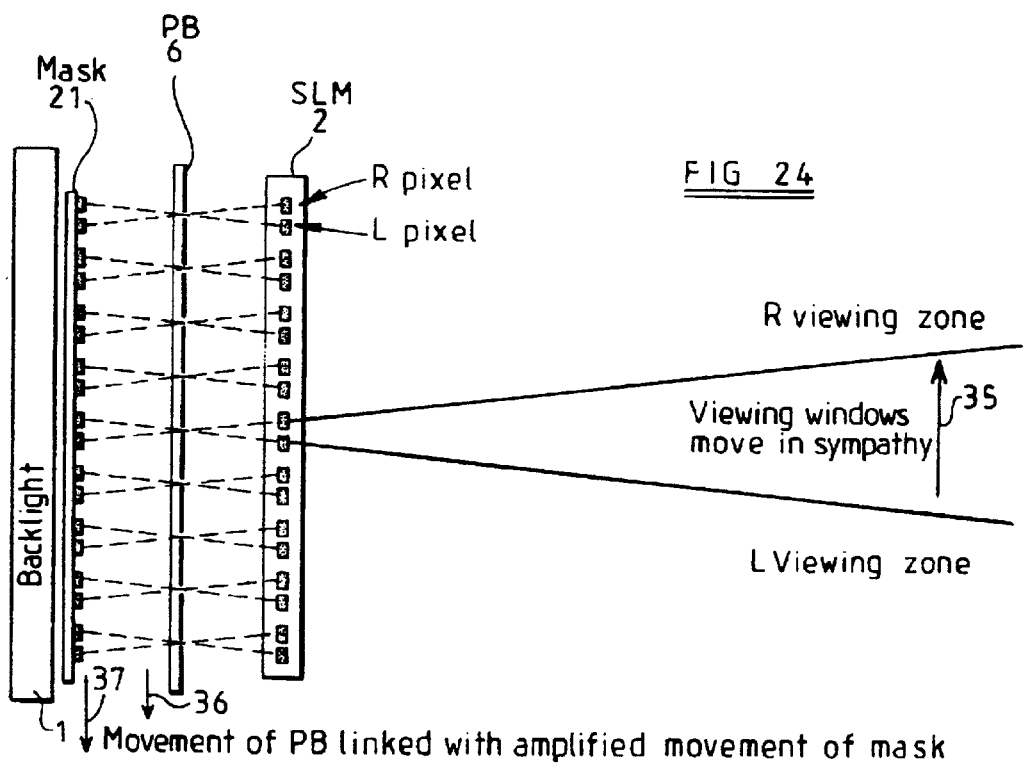
FIG. 24 shows the display of FIG. 18a operated to perform observer tracking.

Displays of this type may be used in observer tracking displays. For instance, the arrangement shown in FIG. 18a need only be modified to provide three viewing windows in each lobe of the display in order for it to be suitable for the tracking techniques disclosed in EP 0726 482 and EP 0 721 131. FIG. 24 illustrates a modification of the display to permit mechanical tracking of an observer in association with an observer tracker (not shown). In order to track an observer moving in the direction of arrow 35, the parallax barrier 6 is required to move in the direction of arrow 36 and the mask 21 is required to move in the direction of arrow 37. However, the mask 21 is required to undergo an amplified movement (twice as far in the case of equal spacing and equal refractive index between the mask 21 and the parallax barrier 6 and between the parallax barrier 6 and the SLM 2) in comparison with the parallax barrier 6 so as to maintain the correct parallax throughout the display. Longitudinal observer tracking may also be provided by displacing the parallax barrier 6 longitudinally with respect to the SLM 2 and by displacing the mask 21 longitudinally by twice that displacement.

The presence of the mask 21 restricts the transmission of light through the display and so reduces the overall brightness of the windows, However, If the variations in the window intensity profiles to be corrected are approximately five to ten percent, the reduction in window brightness which may be expected will be substantially of this order of magnitude. Thus, the improvement in display quality will far outweigh the relatively small reduction in display brightness or the increased power consumption to maintain display brightness. Some of the reduction in brightness may be regained by making the rear surface of mask 21 reflective rather than absorptive. Light blocked from the display output by the mask 21 is returned to the backlight 1 where it may be reflected back towards the display.

Figure 25:
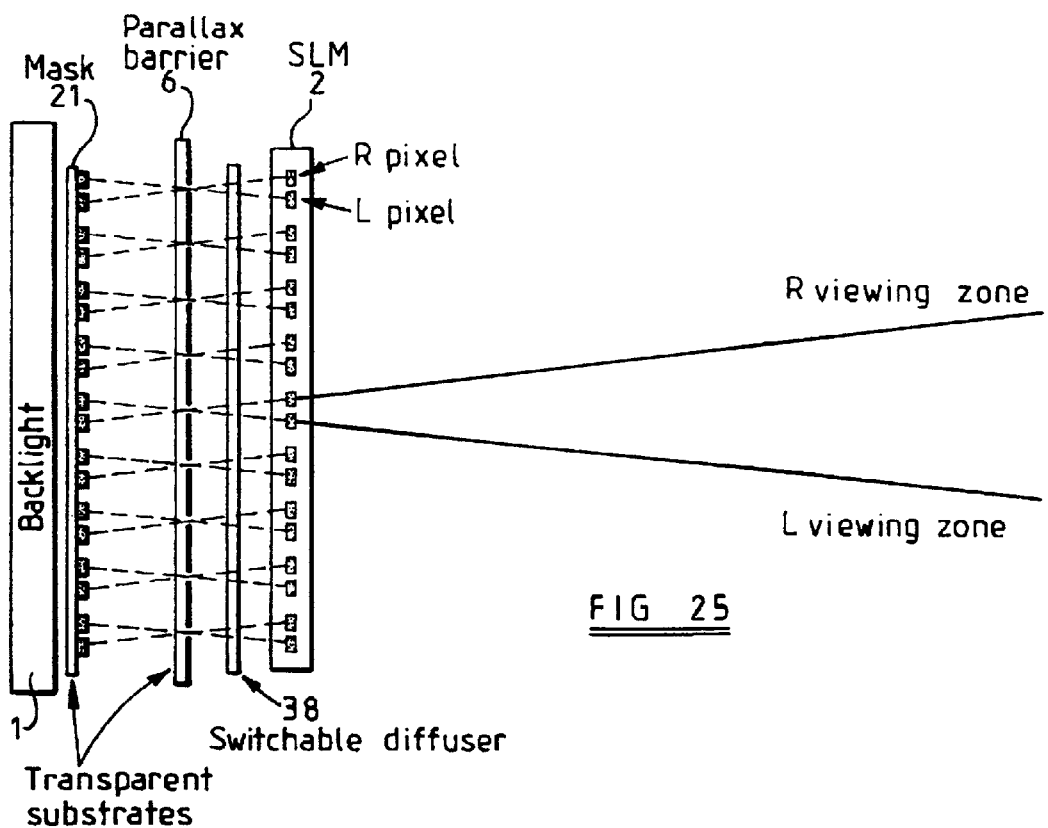
FIG. 25 is a diagrammatic plan view of a switchable display constituting an embodiment of the invention.

FIG. 25 shows a display which differs from that shown, for instance, in FIG. 18a in that a switchable diffuser 38 is disposed between the parallax barrier 6 and the SLM 2. The diffuser 38, which may comprise a polymer dispersed liquid crystal layer, is switchable between highly and lowly scattering states by means of a suitable applied electric field. When the diffuser 38 is in the lowly scattering mode, the display operates as an autostereoscopic display as described hereinbefore. When the diffuser 38 is switched to the highly scattering state, the parallax within the display is lost so that all of the SLM pixels are visible over a wide range of angles in front of the display as in a standard image SLM, Thus, the full resolution of the SLM 2 may be used in the 2D mode.

Figure 26:
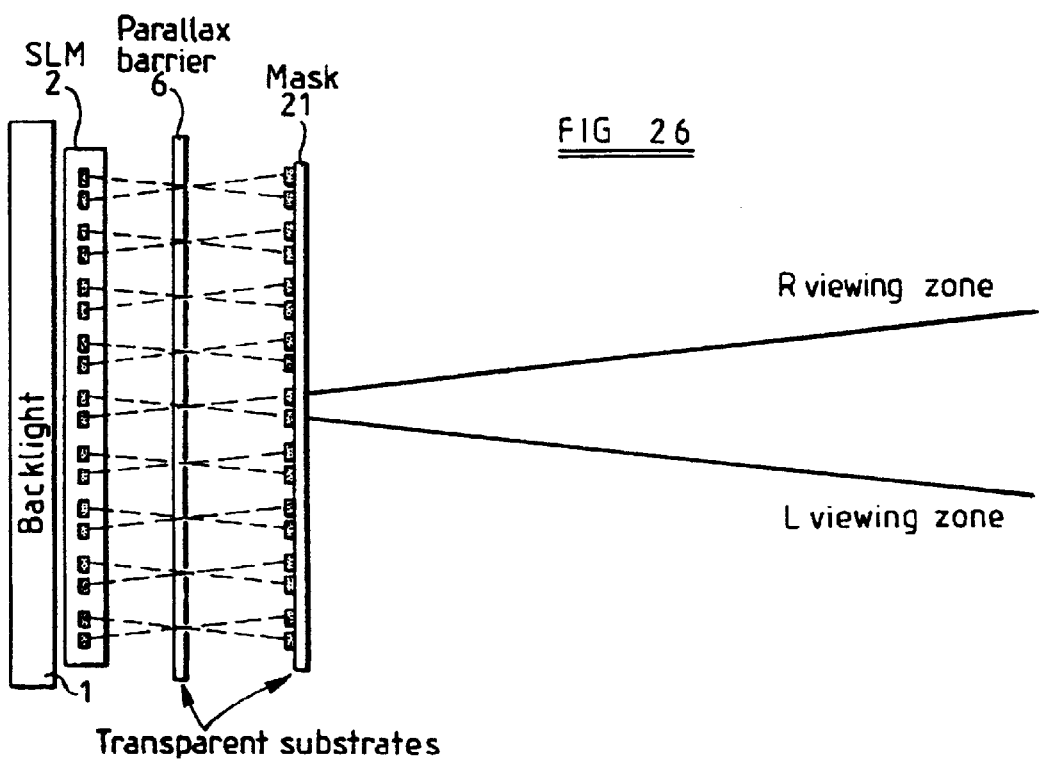
FIG. 26 is a diagrammatic plan view of a display constituting an. embodiment of the invention.

The display shown in FIG. 26 differs from that shown in FIG. 18a in that the SLM 2 is disposed between the backlight 1 and the parallax barrier 6 and the parallax barrier 6 is disposed between the SLM 2 and the mask 21. This display is thus of the front parallax barrier type illustrated in FIG. 1 (b), Operation of the display of FIG. 26 differs from that of FIG. 18a in that the spatial transmission profile of the mask 21 balances diffraction caused in the mask slits and the SLM, The design process for the spatial transmission profile of the mask 21 may have to be iterative, taking diffractive effects of the mask profile itself into account and attempting a convergence on a pattern which balances its awn diffraction.

The mask 21 is used mainly to correct for non-uniform intensity profiles generated by SLM pixels of non-uniform vertical aperture but also has a role in compensating for the Fresnel diffraction effects produced in front parallax barrier displays. These effects are not as significant in front parallax barrier displays as in rear parallax barrier displays but still exist to some extent.

Figure 27:
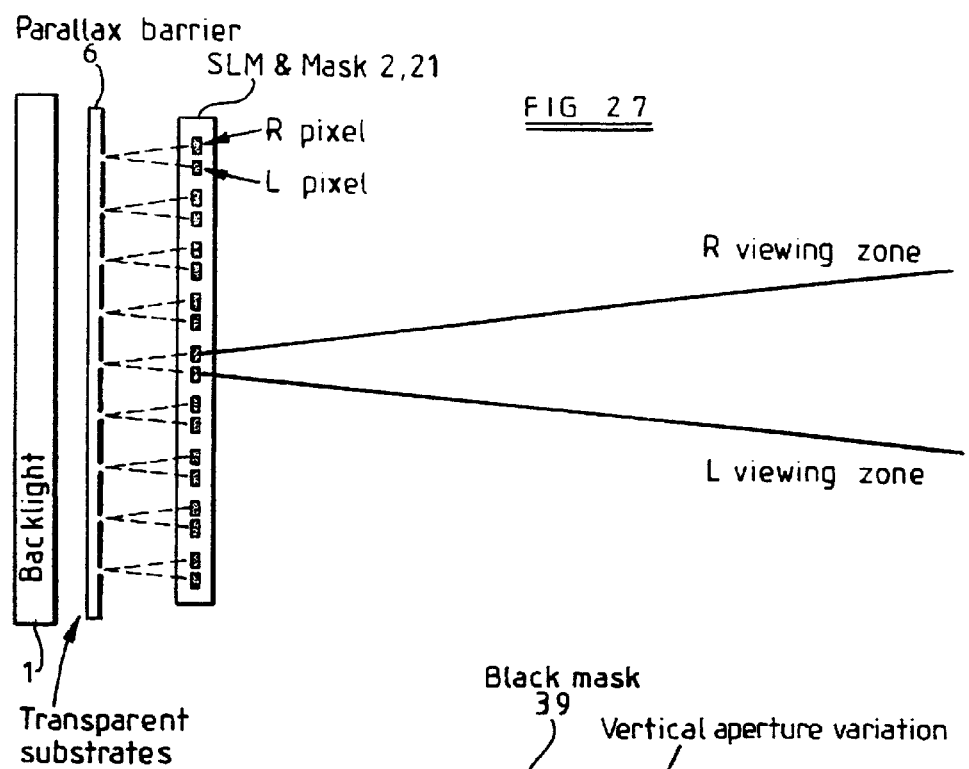
FIG. 27 is a diagrammatic plan view of a display constituting an embodiment of the invention.

FIG. 27 illustrates a display of the rear parallax barrier type shown in FIG. 18a but in which the mask 21 is integral with the SLM 2. In particular, the SLM pixel apertures contain the spatial transmission profile necessary to balance diffractive or non-uniform vertical aperture effects.

Figure 28:
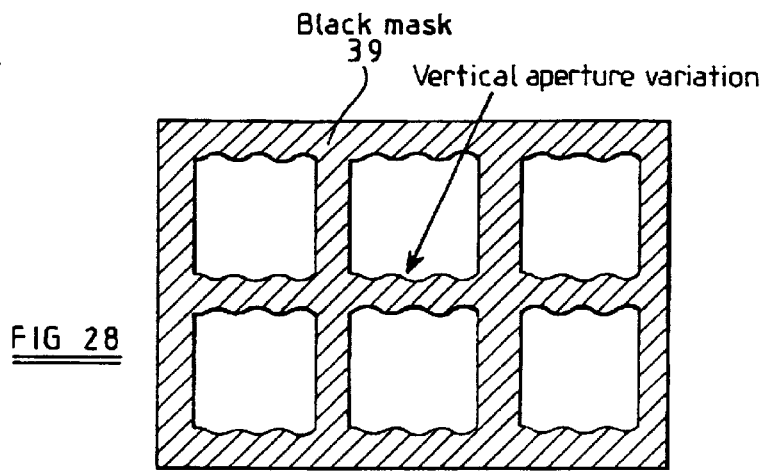
FIG. 28 illustrates a pixel shape suitable for balancing the effects of diffraction.

In one form of the display shown in FIG. 27, the black mask 39 of the SLM 2 which defines the pixel apertures is modified so that the vertical aperture of the pixels as illustrated in FIG. 28 varies in order to generate the appropriate intensity profile within the viewing windows. This arrangement does not require any grey-scaling so that the black mask remains as one or more layers having transparent and opaque regions.

Figure 29:
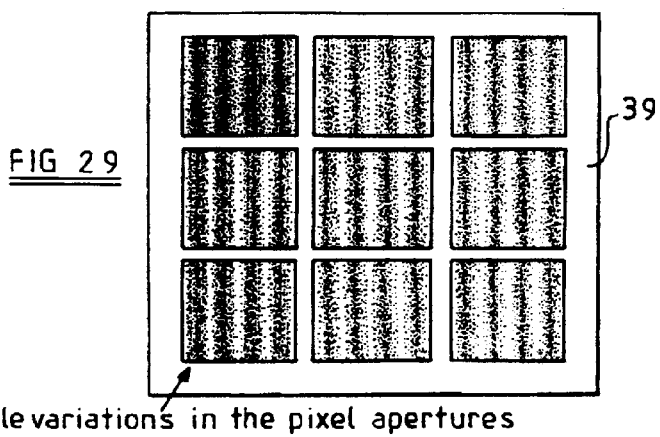
FIG. 29 illustrates a pixel transmission profile for balancing the effects of diffraction.

FIG. 29 illustrates an alternative black mask 39 in which the pixel apertures are provided with spatially varying transmissivities by applying a grey-scale mask over the whole of each pixel aperture. In this arrangement, the transmission profiles balance distribution of light intensities and do not reduce diffractive spreading of light The display shown in FIG. 30 differs from that shown in FIG. 18a in that a lenticular screen 40 is disposed between the mask 21 and the parallax barrier 6. The lenticular screen 40 images the mask onto the viewing windows and is disposed directly behind the slits of the parallax barrier 6 so as to avoid Moire effects. Thus, each slit acts as an aperture stop for the associated lenticule. The lenticular screen provides improved resolution in imaging of the mask element so that there is less blurring of the mask. This in turn permits low resolution in fabrication of the mask 21. However, the small lens apertures limit the resolution increase because lens performance is dominated by diffraction in the small slit aperture. The lenticular lens elements need not be associated with respective slits of the parallax barrier 6 and may have a different pitch which may be larger to ease manufacturing tolerances.

FIG. 31 shows a display which differs from that shown in FIG. 18a in that the mask 21 is combined with the parallax barrier 6. In this embodiment, the mask 21 comprises holograms for generating the balancing window intensities. The holograms 41 may be disposed in the slit apertures of the parallax barrier 6 as shown in FIG. 31 or may be disposed immediately behind the slit apertures on a separate substrate. The backlight is replaced by a light source providing a suitable replay beam 42 for the holograms, The holograms are designed to create a uniform viewing window intensity profile in replay with the SLM 2 and the parallax barrier 6 in place.

Figure 33:
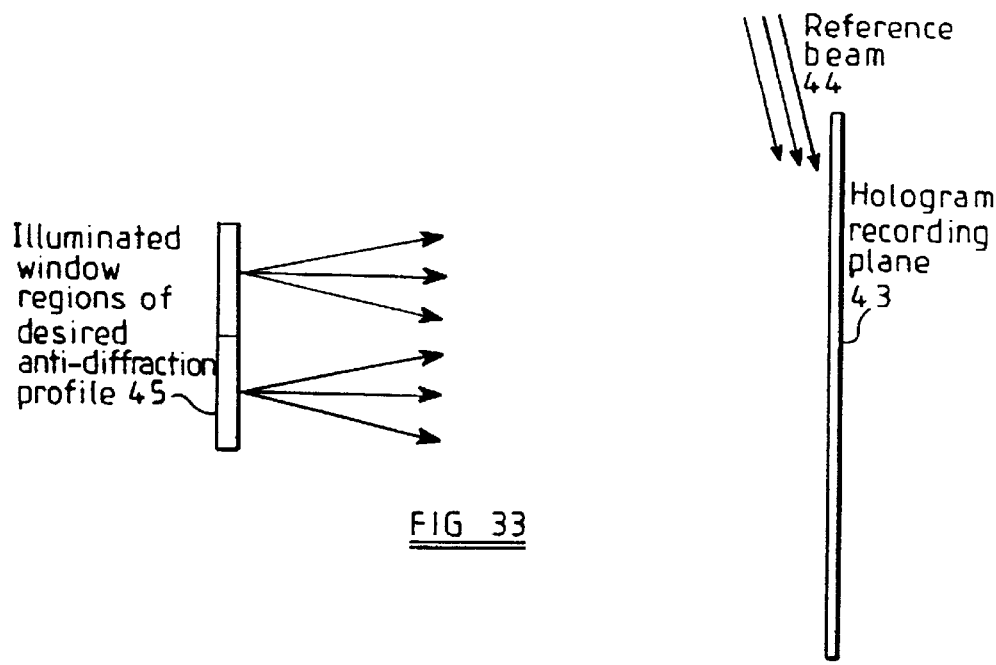
FIG. 33 illustrates diagrammatically another method of making a mask constituting an embodiment of the invention.

FIG. 32 illustrates a method of recording the holograms 41 for the display of FIG. 31. A hologram recording plane 43 is disposed behind the SLM 2, or an SLM of the same type, which is controlled so as to be fully transmissive. The surface of the hologram recording plane 43 facing the SLM 2 is illuminated with a reference beam 44 whereas a recording beam of uniform intensity profile is supplied from the desired window regions 45. The reference and recording beams interfere to create the desired hologram structure on the hologram recording plane 43, FIG. 33 illustrates a modification of the method shown in FIG. 32 to allow the SLM 2 to be removed during recording of the hologram, This arrangement avoids problems with areas on the hologram riot being exposed because of occlusion by the black mask of the SLM 2. The recording beam from the windows 45 differs in that the window regions are illuminated with the desired anti-diffraction profile.

Figure 34:
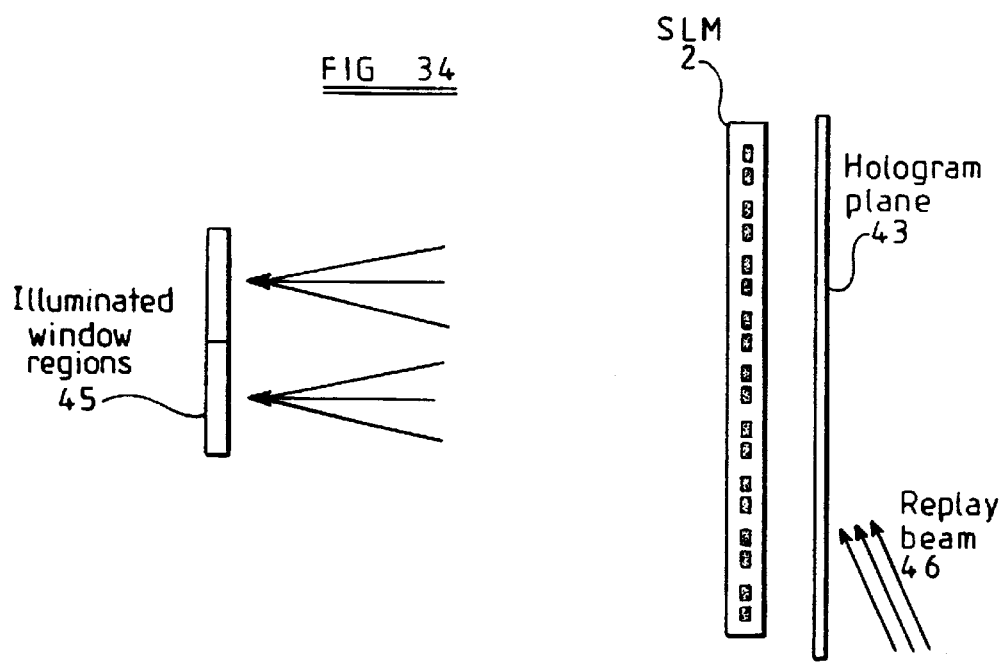
FIG. 34 illustrates diagrammatically an arrangement for illuminating a mask made by the method of FIG. 32 or FIG. 33.

FIG. 34 illustrates replaying of the recorded hologram plane 43 by means of a replay beam 46. The replay beam 46 is a beam of collimated light of limited spectral bandwidth and at a defined reference angle as decided during recording of the holograms. The replay beam is diffracted so as to recreate the uniformly illuminated windows.

Because of the monochromatic nature of holograms, each slit of the parallax barrier 6 may be associated with one colour of a filter of the SLM 2 so as to be tuned for optimum performance at that colour.

FIG. 35 shows a display of the front parallax barrier type in which the mask 21 formed on a transparent substrate is disposed between the backlight 1 and the SLM 2. However, the parallax barrier 6 as described hereinbefore is replaced by a parallax barrier arrangement of the type disclosed in British patent application No: 9713985.1 and European patent application No: 97307085.7. This arrangement comprises a patterned polarisation modifying parallax barrier 6a cooperating with a removable polariser 6b.

When operating in the 3D autostereoscopic mode, the removable polariser 6b is in place as shown in FIG. 35. The polarisation modifying parallax barrier 6a comprises slit regions such as 6c separated by barrier regions such as 6d. The SLM 2 includes an output polariser 50 that light supplied to the polarisation modifying parallax barrier 6a is linearly polarised. In one arrangement, the slit regions 6c have no effect on polarisation whereas the barrier regions 6d rotate the polarisation by 90°. The polarising axis of the removable polariser 6b is parallel to the polarisation axis of the output polariser of the SLM 2 so that light passing through the slit regions 6c passer through the polariser 6b whereas light passing through the barrier regions 6d is extinguished by the polariser 6b, In another arrangement, the slit regions 6c rotate the polarisation of light by 90° whereas the barrier regions 6d have no effect on polarisation. The polarisation axis of the polariser 6b is perpendicular to the polarisation axis of the output polariser of the SLM 2 so that, again, light from the slit regions 6c passes through the polariser 6b whereas light the from the barrier regions 6d is extinguished by the polariser 6b. As described hereinbefore, the mask 21 corrects for non-uniformities in the display viewing zones.

In the 2D mode of operation, the polariser 6b is removed so that polarised light passing through the regions 6c and 6d is output from the display without attenuation or extinction, However, because of the different polarisations of light from the regions 6c and 6d, the polarisation modifying parallax barrier 6a may cause diffraction and unevenness of illumination of the viewing zones. The mask 21 reduces such variations In illumination as described hereinbefore.

FIG. 36 illustrates a display which differs from that of FIG. 35 in that it is of the rear parallax barrier type. The removable polariser 6b is disposed between the backlight 1 and the mask 21 whereas the polarisation modifying parallax barrier 6a is disposed between the mask 21 and the SLM 2. The polariser 6b thus acts as the input polariser for the parallax barrier in the 3D mode and an input polariser of the SLM 2 acts as the output polariser of the parallax barrier, which therefore functions in the same way as described with reference to FIG. 35. FIG. 36 also shows the presence of an optional switchable diffuser 38 of the type described hereinbefore with reference to FIG. 25.

Figure 9:
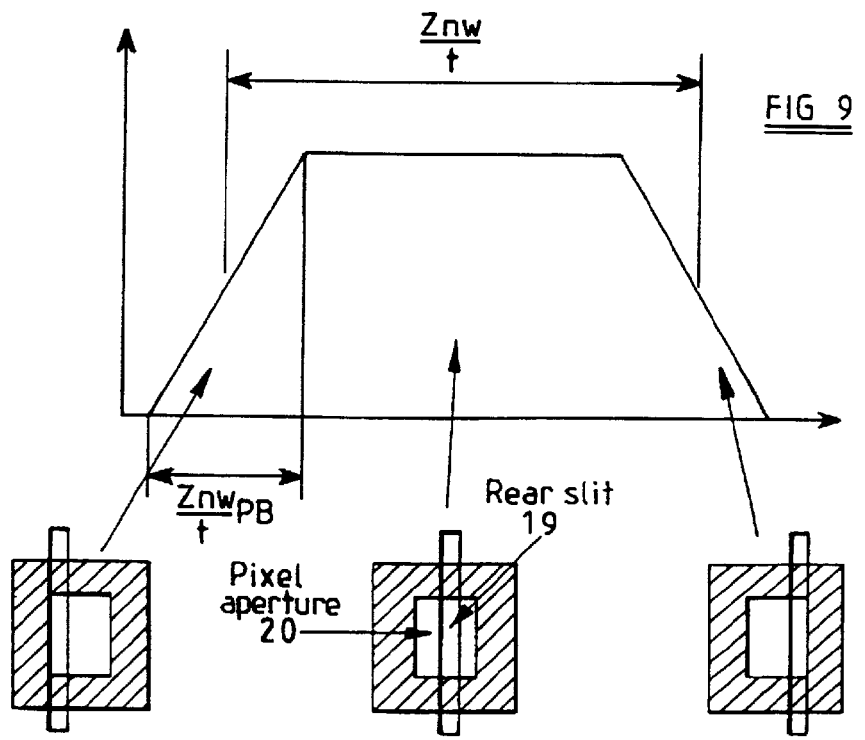
FIG. 9 is a graph illustrating light intensity against lateral observer position for a rectangular pixel aperture and rear parallax barrier slit without diffraction.
Figure 10:
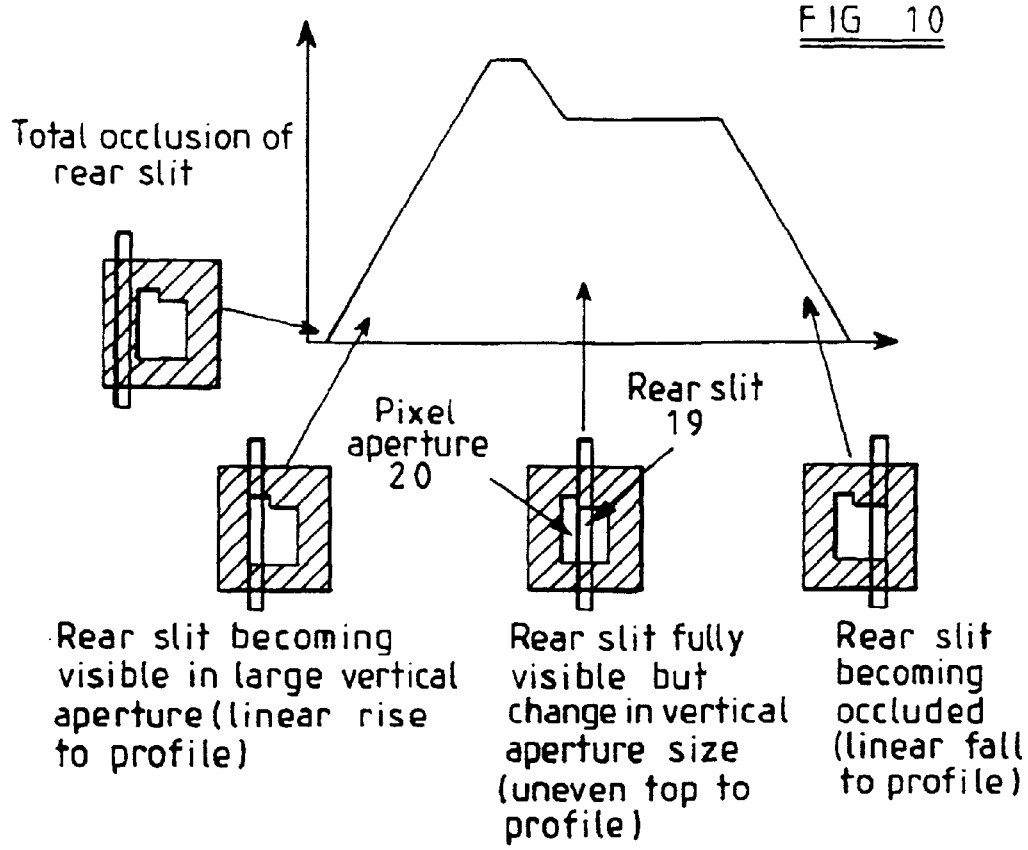
FIG. 10 is a graph similar to FIG. 9 illustrating viewing window intensity profile for a non-rectangular pixel aperture.
Figure 11:
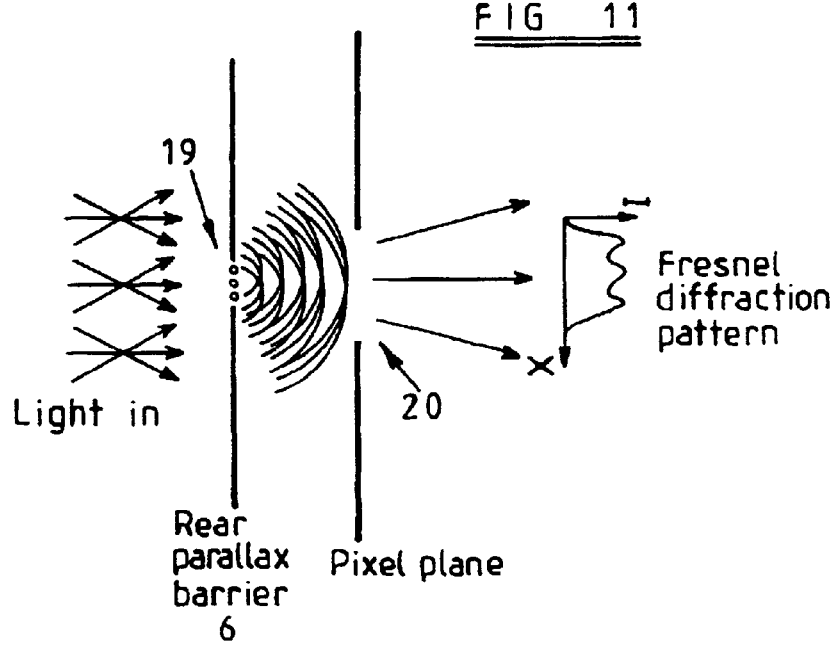
FIG. 11 illustrates the origin of Fresnel diffraction at a pixel aperture.
Figure 12:
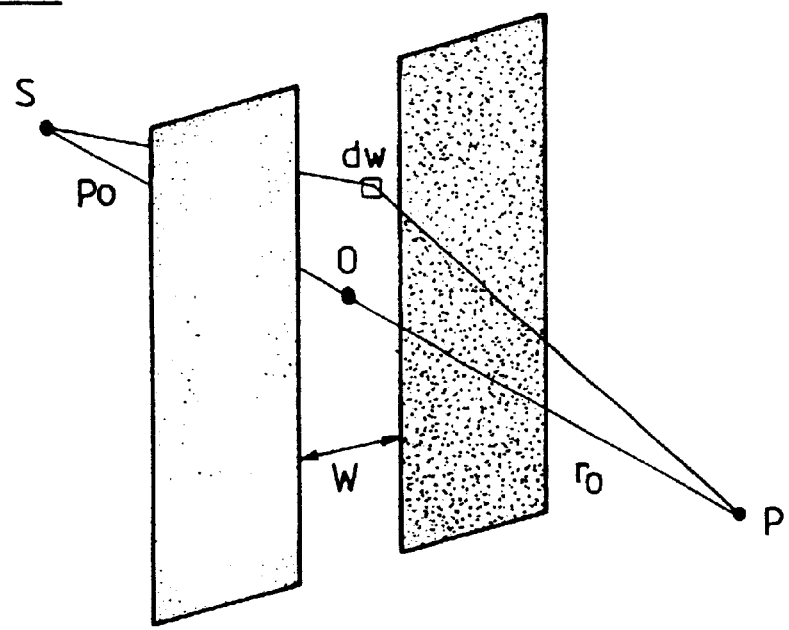
FIG. 12 is a diagram illustrating the geometry used in Fresnel diffraction calculations.
Figure 13:
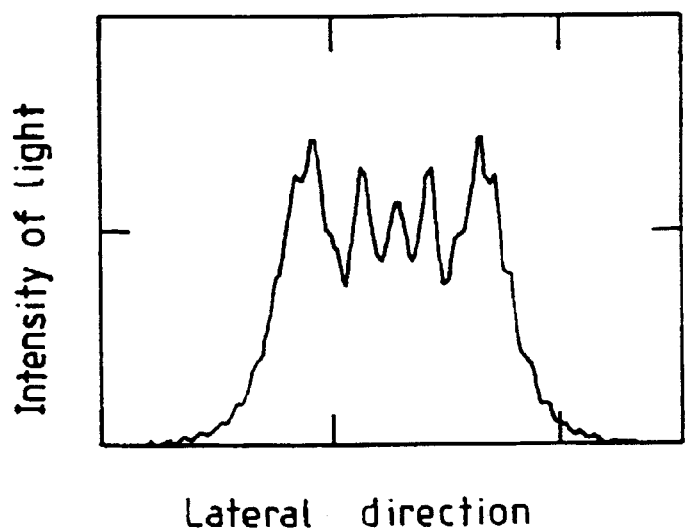
FIG. 13 illustrates intensity against lateral direction of an example of a Fresnel diffraction profile.
Figure 14:
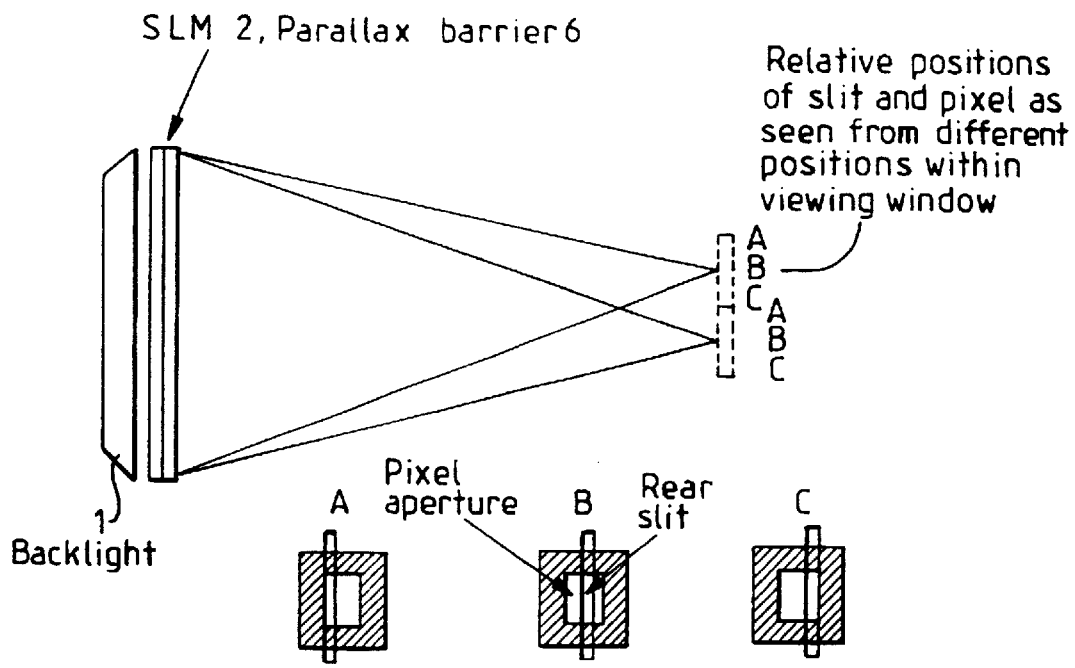
FIG. 14 is a diagrammatic plan view of an autostereoscopic display illustrating relative positions of a rear parallax barrier slit and a pixel aperture as seen from different lateral viewpoints in viewing windows.
Figure 15:
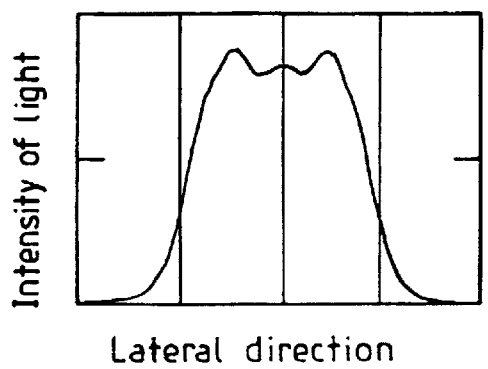
FIG. 15 is a graph of light intensity against lateral direction illustrating an example of a viewing window light intensity profile for an autostereoscopic 3D display.

As shown in FIG. 9, the combination of a parallax barrier and rectangular SLM pixels results in an illumination profile which is characterised by a flat centre region which is useful for viewing the display because of the uniform illumination level. The width of this region is determined by the ratio of the pixel size to the slit width of the parallax barrier. Wider slits produce narrower uniform centre regions but also improve the light throughout and hence brightness of the display. It is therefore desirable to provide wider uniform central regions while retaining wide parallax barrier slits in order to produce a bright display with wider useful viewing windows.

Figure 30:
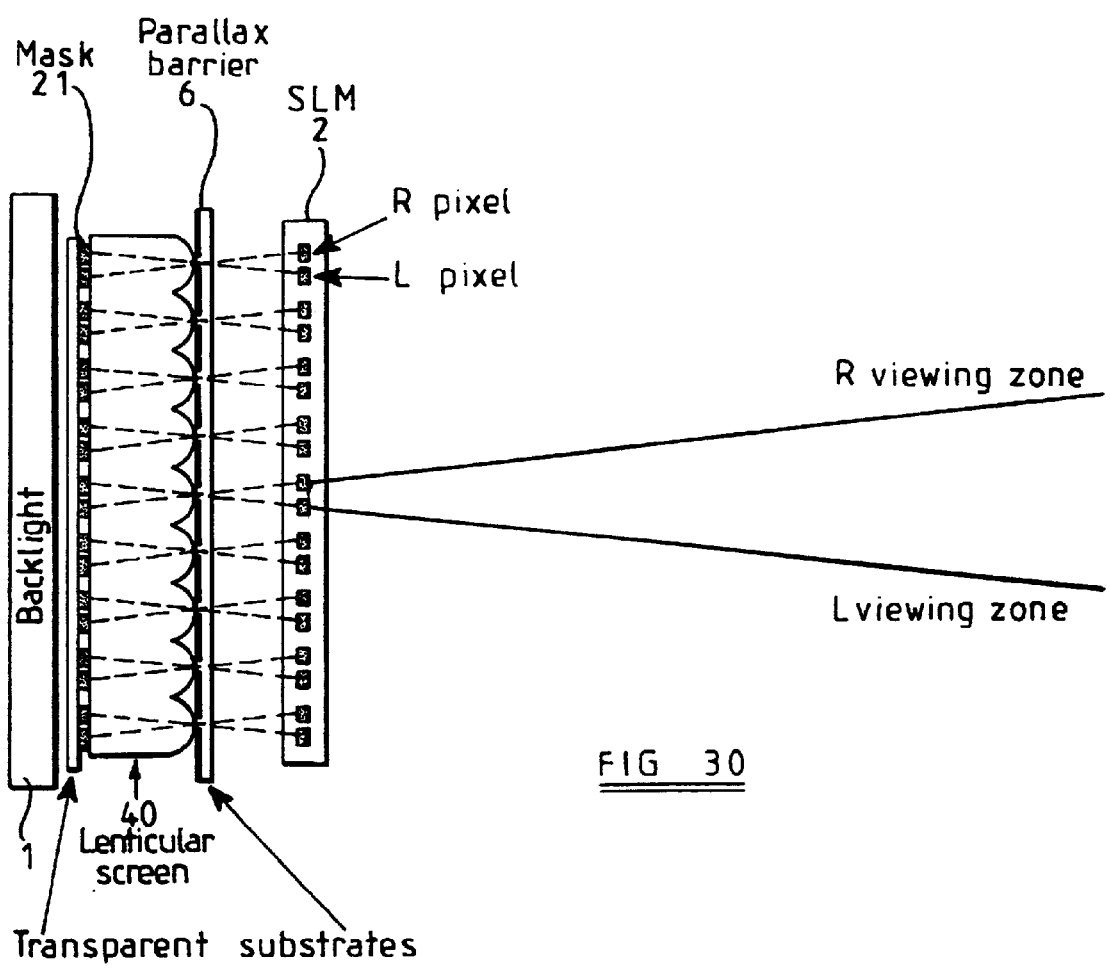
FIG. 30 is a diagrammatic plan view of a display constituting an embodiment of the invention.
Figure 37:
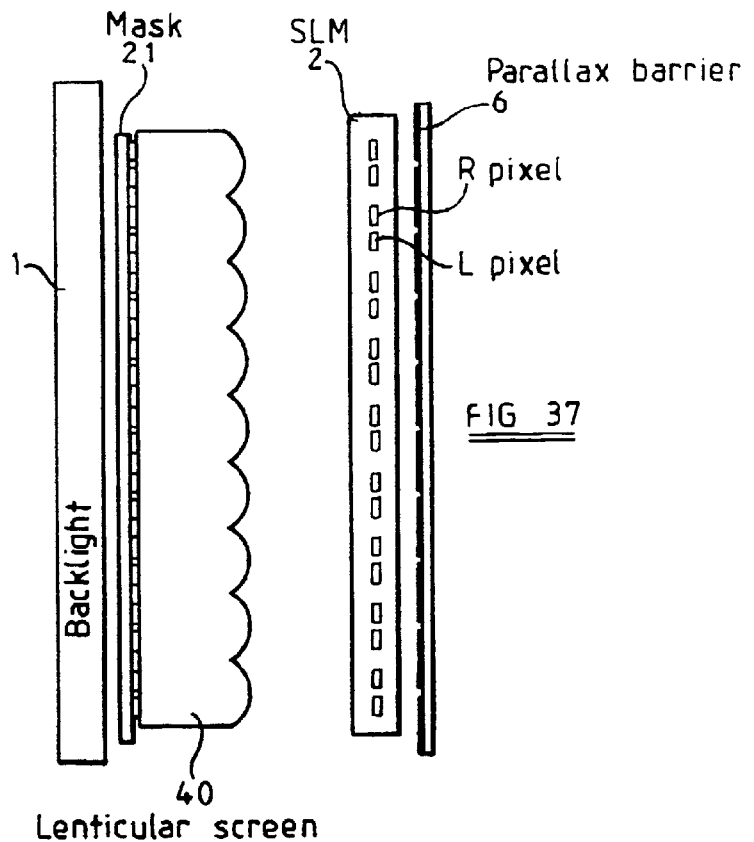
FIG. 37 is a diagrammatic plan view of a display constituting an embodiment of the invention.
Figure 38:
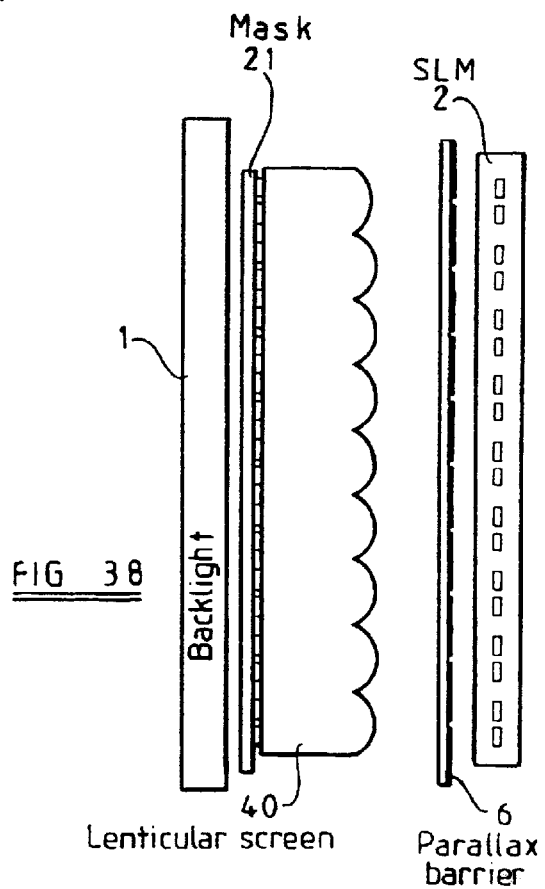
FIG. 38 is a diagrammatic plan view of a display constituting an embodiment of the invention.
Figure 39A:
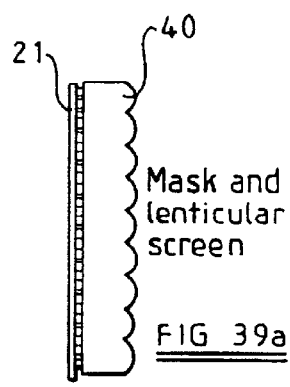
FIG. 39a is a diagrammatic plan view of part of a display.
Figure 39B:
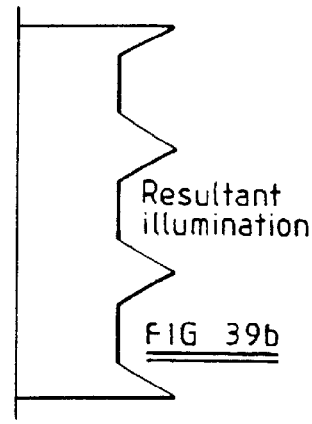
Figure 40A:
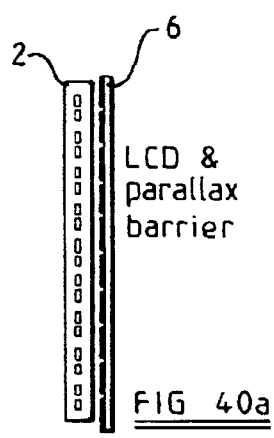
FIG. 40a is a diagrammatic plan view of the remainder of a display constituting an embodiment of the invention.
Figure 40B:
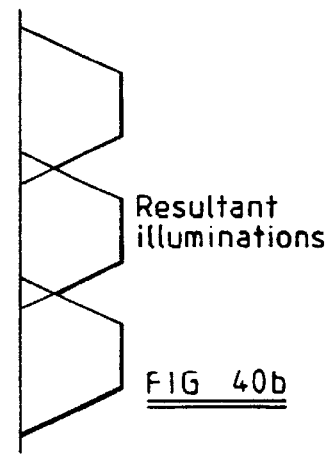

A technique for achieving this is illustrated in FIG. 37, which illustrates a display of a type similar to that shown in FIG. 30 but of the front parallax barrier type. In particular, a lenticular screen 40 is disposed on the mask 21 and, in combination with the backlight 1, alters the illumination profile of the SLM 2 and the parallax barrier 6 so as to widen the uniform central region of the illumination profile while permitting the use of wider parallax barrier slits to increase display brightness. FIG. 38 shows a similar display but of the rear parallax barrier type, FIG. 39a illustrates the illumination profile produced by the combination of the backlight 1, the mask 21 and the lenticular screen 40. The profile has a uniform centre region which then rises linearly towards the edge as shown in FIG. 39b. FIG. 40a shows the combination of the SLM 2 and the parallax barrier 6 and FIG. 40b illustrates the illumination profile at the viewing windows which would be achieved if the combination shown in FIG. 40a were illuminated in the conventional manner as described hereinbefore with the SLM pixels fully transmissive. This profile corresponds to the degree of visibility of the pixels of the SLM 2 as determined by the slits of the parallax barrier 6.

Figure 41A:
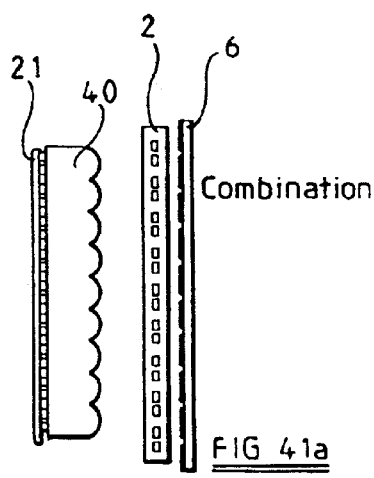
Figure 41B:
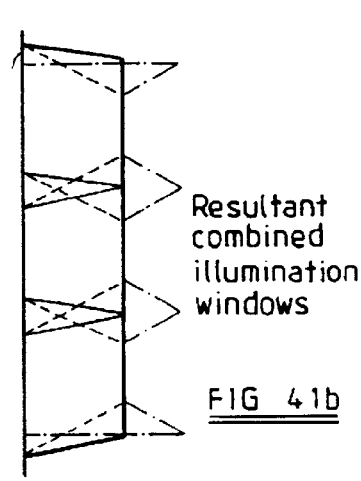

FIG. 41a illustrates diagrammatically the combination of elements shown in FIG. 37. FIG. 41b illustrates the illumination profile of FIG. 39b in chain dot lines, the illumination profile of FIG. 40b in broken lines and the resultant illumination profile in unbroken lines. The resultant profile has a wider uniform central region so as to reduce undesirable visual artefacts caused by intensity variations as an observer moves laterally. The quality and viewing freedom of the viewing windows are therefore substantially improved.

Figure 42A:
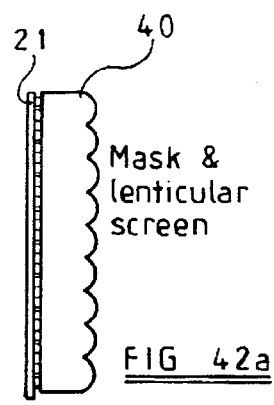
FIG. 42a is a diagrammatic plan view of part of a display.
Figure 42B:
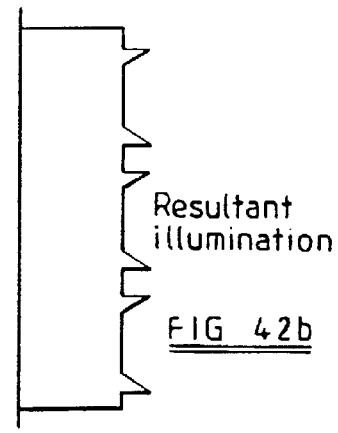
Figure 43A:
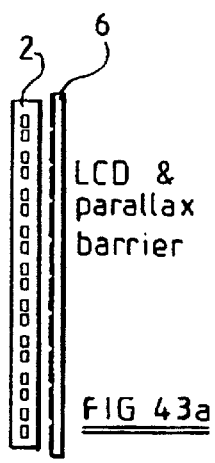
FIG. 43a is a diagrammatic plan view of the remainder of a display constituting an embodiment of the invention.
Figure 43B:
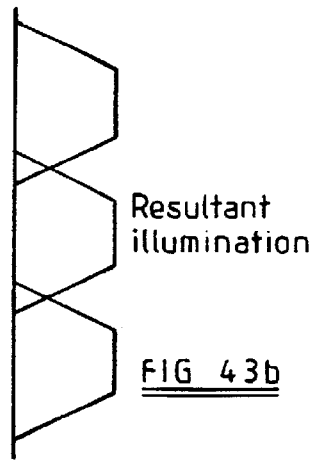
Figure 44A:
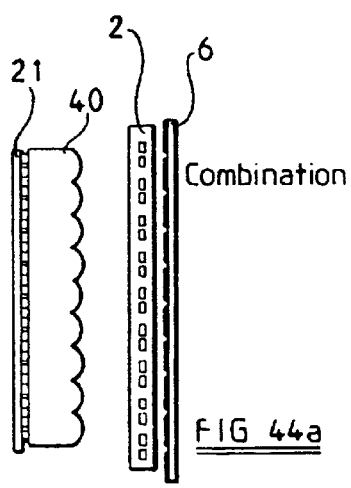
Figure 44B:
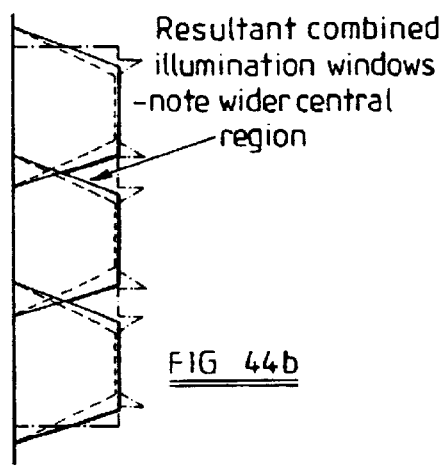

As compared with the conventional illumination profile shown in FIG. 40b, the profile shown in FIG. 41b exhibits higher levels of crosstalk between adjacent windows because the individual window illumination profiles overlap and the overlapping regions are brighter with respect to the centre region, A compromise between increased width of uniform intensity centre regions and increased crosstalk has to be found and this may be achieved as illustrated in FIGS. 42a to 44b. FIGS. 42a, 43a and 44a illustrate the same general arrangements as shown in FIG. 39a, 40a and 41 a, respectively, but the lenticular screen 40 and the mask 21 are arranged to produce the illumination profile shown in FIG. 42b. The conventional illumination profile shown in FIG. 43b is the same as that shown in FIG. 40b and, when combined with the illumination profile of FIG. 42b, gives rise to the resultant profile shown in FIG. 44b. In this case, the resultant profile has wider uniform centre regions than the profile shown in FIG. 43b but reduced crosstalk as compared with the resultant profile shown in FIG. 41b. Thus, in this case, the width of the uniform centre regions has been somewhat sacrificed in favour of reduced crosstalk.

What is claimed is:

1. A directional display comprising a display arrangement for producing a plurality of viewing zones including different display images, each of the plurality of viewing zones having a non-uniform first angular intensity profile with a first angularly varying component to produce a corresponding intensity profile at the viewing zone, the display further comprising an angular intensity profile compensator for superimposing in the viewing zones a second angular intensity profile having a second angularly varying component to produce a profile having a spatially varying component which is substantially the inverse of the first angularly varying component, so as to reduce or substantially cancel spatially varying components within at least a main part of the viewing zones.

2. A display as claimed in claim 1, wherein the display arrangement comprises a spatial light modulator having a plurality of the picture elements and array of discrete light sources.

3. A display as claimed in claim 2, wherein the picture elements are arranged as columns and the light sources comprise parallel evenly spaced line sources.

4. A display as claimed in claim 3, wherein the light sources comprise a diffuse backlight and a parallax barrier, and wherein the parallax barrier comprises a plurality of slits, each of which cooperates with a respective group of the picture element columns to form the viewing zones of a zeroth order lobe.

5. A display as claimed in claim 4, wherein the picture elements are of substantially constant vertical aperture, the spatial light modulator and the parallax barrier cooperate to produce Fresnel diffraction, and the compensator is arranged to compensate for the non-uniform first angular intensity profile caused by the Fresnel diffraction.

6. A display as claimed in claim 4, wherein the picture elements are of non-constant vertical aperture, the spatial light modulator and the parallax barrier cooperate to produce Fresnel diffraction, and the compensator is arranged to compensate for the non-uniform first angular intensity profile caused by the non-constant vertical aperture and the Fresnel diffraction.

7. A display as claimed in claim 4, wherein the compensator comprises a mask disposed between the parallax barrier and the backlight, the mask comprising a plurality of strips of varying light transmissivity which cooperate with the slits of the parallax barrier to form the second angularly varying intensity profile.

8. A display as claimed in claim 7, wherein the strips are of substantially the same width as the picture element columns.

9. A display as claimed in claim 7, wherein the ratio of the lateral pitches of the strips and the slits is substantially equal to the ratio of the lateral pitches of the slits and the groups of the picture element columns.

10. A display as claimed in claim 7, wherein the parallax barrier and the mask are formed on opposite faces of a common transparent substrate.

11. A display as claimed in claim 7, wherein $n_1 t_1 = n_2 t_2$, where $n_1$ is the effective refractive index between a picture element plane of the spatial light modulator and the parallax barrier, $t_1$ is the thickness between the picture element plane of the spatial light modulator and the parallax barrier, $n_2$ is the effective refractive index between the parallax barrier and the mask, and $t_2$ is the thickness between the parallax barrier and the mask.

12. A display as claimed in claim 7, wherein a lenticular screen is disposed between the mask and the parallax barrier.

13. A display as claimed in claim 12, wherein the lenticular screen comprises a plurality of lenticules, each of which is aligned with a respective strip of the mask.

14. A display as claimed in claim 2, wherein the light sources comprise a diffuse backlight and a parallax barrier.

15. A display as claimed in claim 14, wherein the picture elements are of substantially constant vertical aperture, the spatial light modulator and the parallax barrier cooperate to produce Fresnel diffraction, and the compensator is arranged to compensate for the non-uniform first angular intensity profile caused by the Fresnel diffraction.

16. A display as claimed in claim 14, wherein the picture elements are of non-constant vertical aperture, the spatial light modulator and the parallax barrier cooperate to produce Fresnel diffraction, and the compensator is arranged to compensate for the non-uniform first angular intensity profile caused by the non-constant vertical aperture and the Fresnel diffraction.

17. A display as claimed in claim 14, wherein the parallax barrier comprises:

a first polariser;

a second polariser; and a polarisation modifying layer disposed between the first and second polarisers and having slit regions and barrier regions for supplying light of orthogonal polarisations.

18. A display as claimed in claim 17, wherein the second polariser comprises part of the spatial light modulator.

19. A display as claimed in claim 17, wherein the first polariser is removable to provide a non-directional mode of operation.

20. A display as claimed in claim 2, wherein a switchable diffuser is disposed between the spatial light modulator and the array of light sources and is switchable between a diffusing mode and a substantially non-diffusing mode.

21. A display as claimed in claim 20, wherein the switchable diffuser comprises a polymer dispersed liquid crystal layer.

22. A display as claimed in claim 2, wherein the compensator comprises means for defining aperture transmission properties of the picture elements.

23. A display as claimed in claim 22, wherein the defining means comprises a spatial light modulator black mask defining the shape of picture element apertures.

24. A display as claimed in claim 22, wherein the defining means spatially varies the transmissivity of picture element apertures.

25. A display as claimed in claim 1, wherein the display arrangement comprises a diffuse backlight, parallax barrier and a spatial light modulator disposed between the backlight and parallax barrier.

26. A display as claimed in claim 25, wherein the spatial light modulator comprises a plurality of picture element columns and the parallax barrier comprises a plurality of parallel evenly spaced slits, each of which cooperates with a respective group of the picture element columns to form the viewing zones of a zeroth order lobe.

27. A display as claimed in claim 26, wherein the compensator comprises a mask comprising a plurality of strips of varying light transmissivity, the parallax barrier is disposed between the spatial light modulator and the mask, and each strip cooperates-with a respective slit to form the second angularly varying intensity pattern.

* * * * *